United States Patent [19]

West et al.

[11] 4,396,435
[45] Aug. 2, 1983

[54] FLUID HANDLING SYSTEM

[75] Inventors: Jon K. West; Arthur J. Catotti; Saverio F. Pensabene, all of Gainesville, Fla.

[73] Assignee: General Electric Company, Gainesville, Fla.

[21] Appl. No.: 349,341

[22] Filed: Feb. 16, 1982

Related U.S. Application Data

[63] Continuation of Ser. No. 162,544, Jun. 24, 1980, abandoned.

[51] Int. Cl.³ .............................................. B08B 3/04
[52] U.S. Cl. ...................................... 134/10; 134/18; 134/26
[58] Field of Search .................. 134/10, 18, 26, 57 R, 134/60, 95, 98, 103, 113

[56] References Cited

U.S. PATENT DOCUMENTS

| | | | |
|---|---|---|---|
| 3,441,035 | 4/1969 | Edwards | 134/103 |
| 3,515,094 | 6/1970 | McVey | 134/57 R X |
| 3,916,937 | 11/1975 | Nystrom | 134/103 X |
| 3,945,388 | 3/1976 | Clark | 134/103 X |
| 4,184,891 | 1/1980 | Pollozec et al. | 134/10 |
| 4,195,500 | 4/1980 | Tobita et al. | 134/113 X |
| 4,226,642 | 10/1980 | Baran | 134/18 X |
| 4,319,930 | 3/1982 | Yano et al. | 134/10 |

Primary Examiner—Richard V. Fisher
Attorney, Agent, or Firm—Pollock, Vande Sande & Priddy

[57] ABSTRACT

A fluid handling system for circulating a selected fluid medium from a selected tank through one of a plurality of wash tanks for a predetermined period of time, draining the selected wash tank and thereby returning the fluid to the selected tank, and then filling the selected wash tank from a different tank and continuing the sequence for each of the different tanks. After a wash by medium from each tank, the object being washed is removed, and another is inserted. The sequential washes are repeated. This operation continues until the contents of a predetermined one of the tanks has degraded by a predetermined increase in impurity concentration, and for thereafter initiating a cascade whereby the tank having fluid of highest impurity concentration is drained, and the contents of each other tank is transferred to an adjacent tank, and completing the sequence by filling the predetermined tank with relatively pure fluid. The cascading sequence is effected with minimal impact on the washing sequences. Each of the fluid transfers from tank to wash tank and back is effected on a timed basis without significant mixing notwithstanding the fact that the particular medium employed prevents the use of a level sensor to identify when a wash tank has been pumped dry.

11 Claims, 10 Drawing Figures

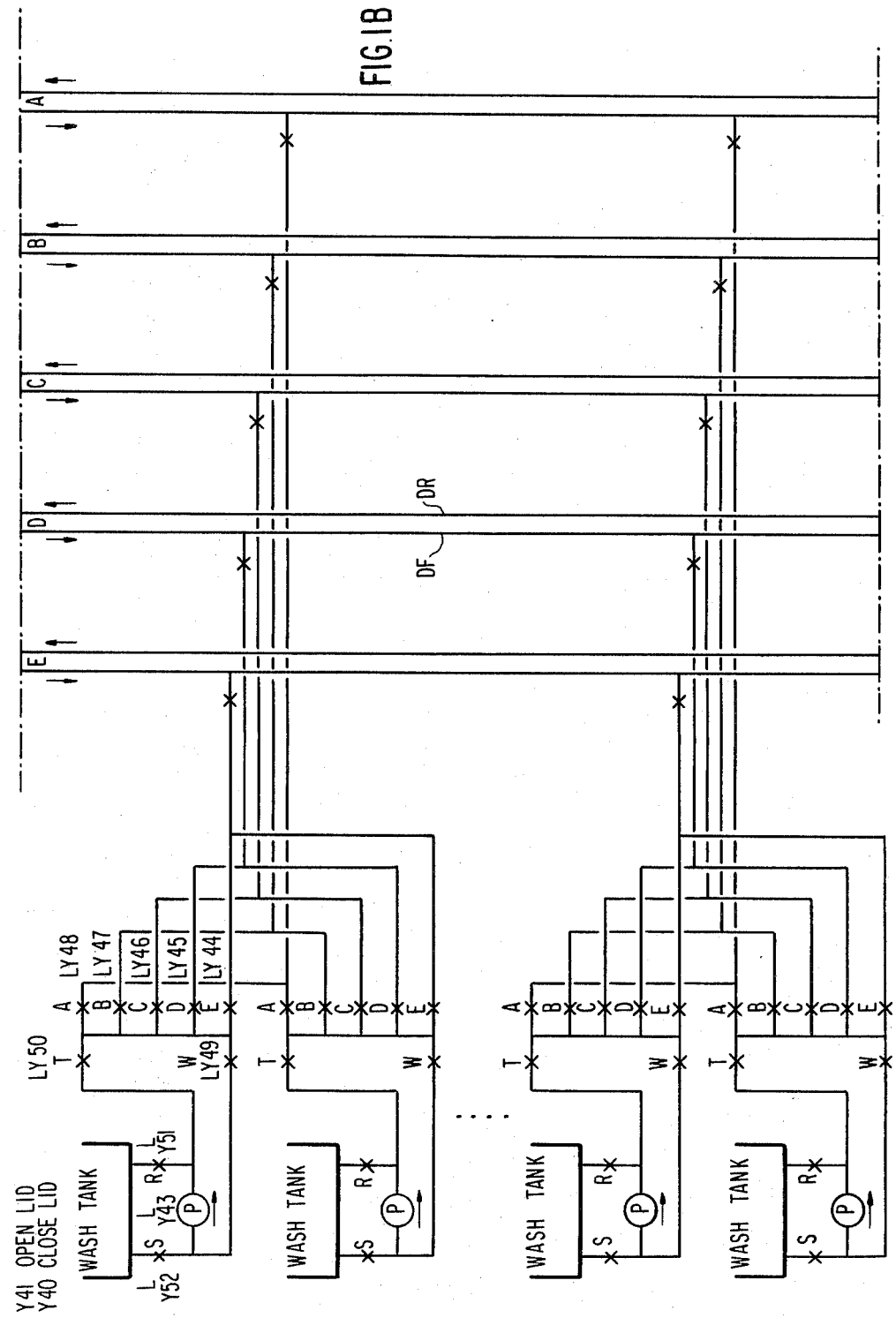

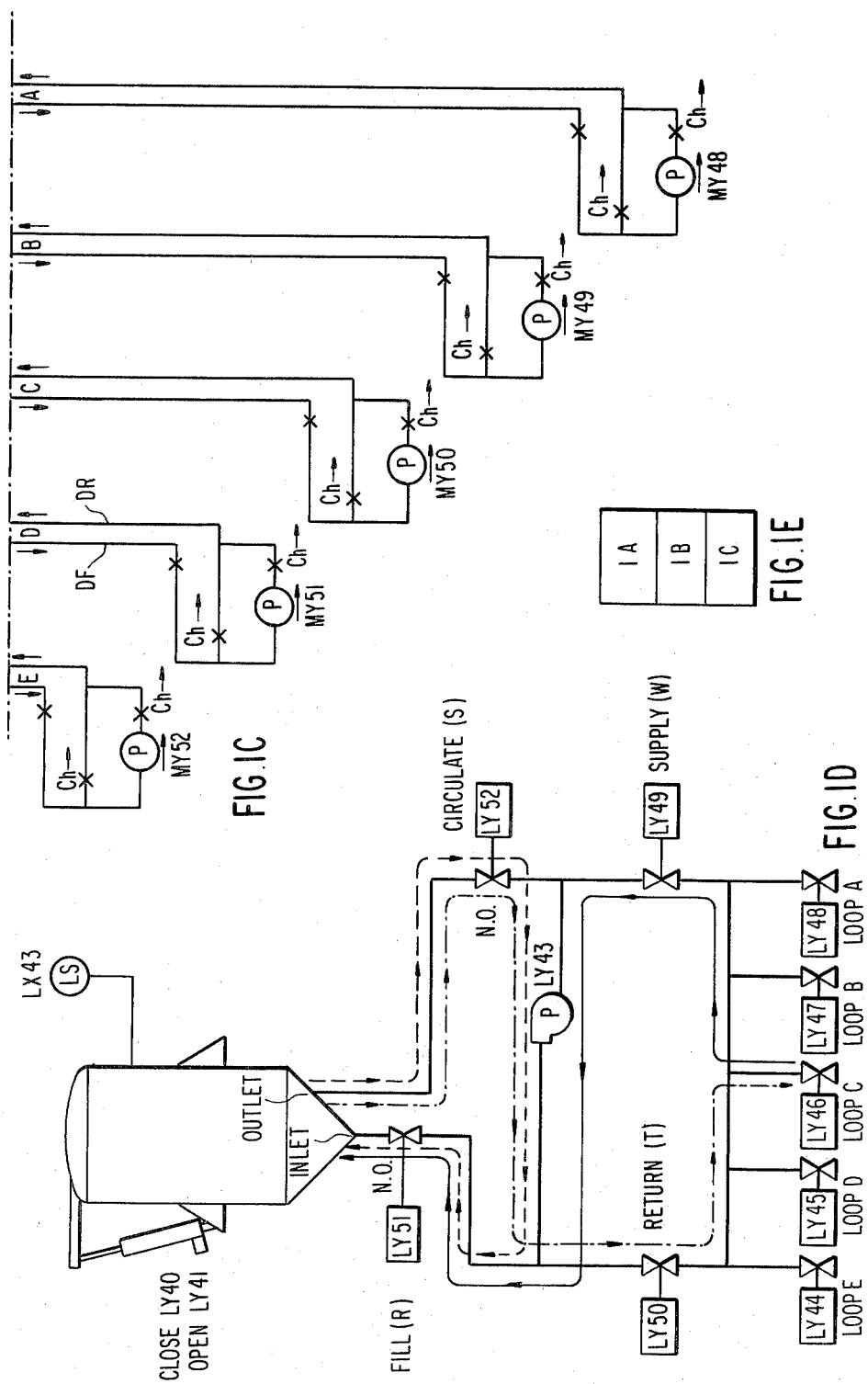

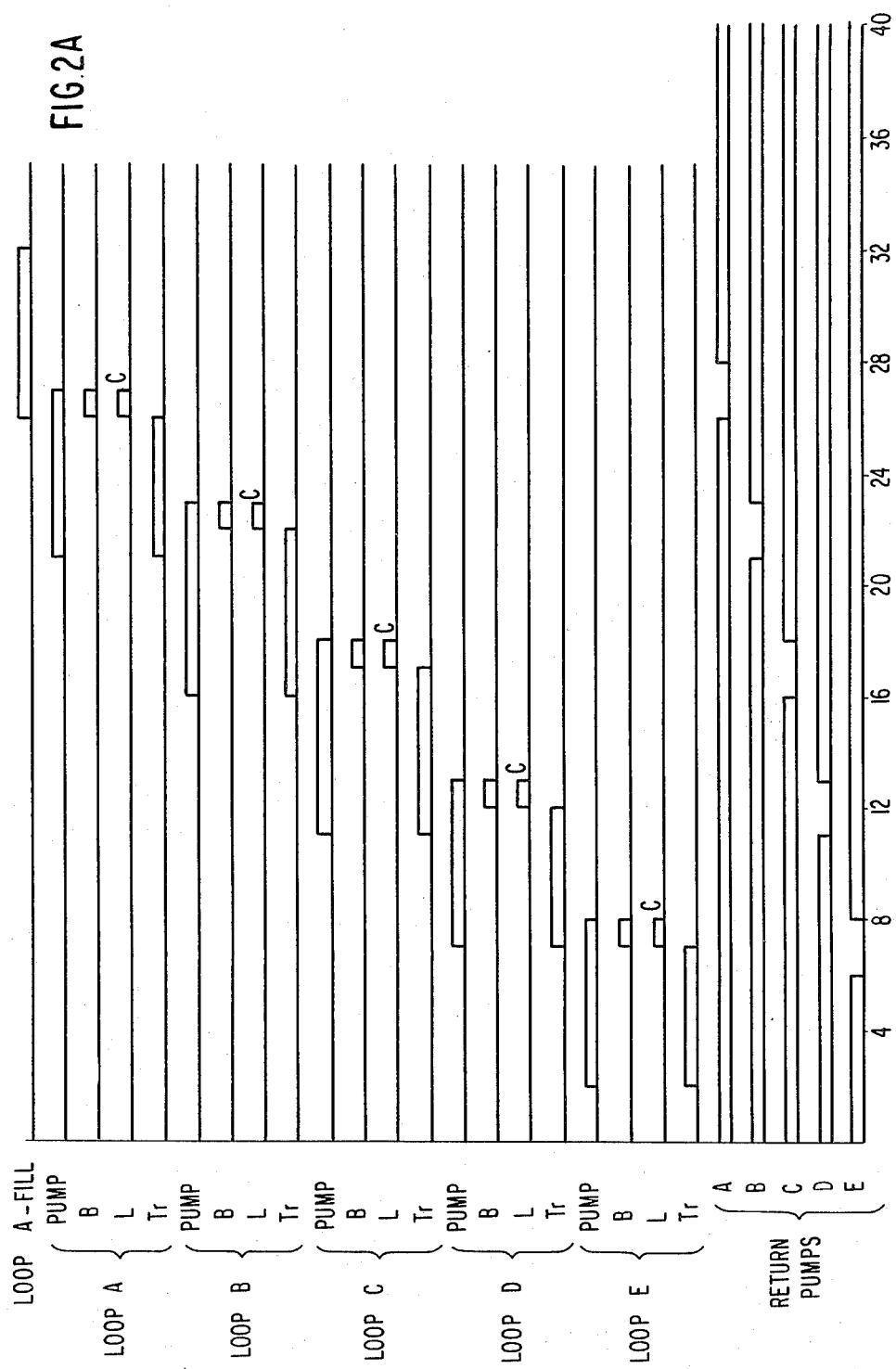

FLUID HANDLING SYSTEM

This is a continuation of application Ser. No. 162,544, filed June 24, 1980, now abandoned.

FIELD OF THE INVENTION

The present invention relates to a fluid handling system particularly adapted for handling washing fluid which is employed to wash battery plate material in the course of battery manufacture.

BACKGROUND OF THE INVENTION

In battery manufacture material which eventually forms the battery plates undergoes a number of treatments, one of which is impregnation into the battery plates of selected material such as sodium nitrate. A further step in the process of preparing battery plate material is a washing of the impregnated plates so as to remove excess material from the plates. This results in the washing medium carrying away this excess material, thus increasing the concentration of that material in the washing medium. Due to existing environmental regulations this used wash medium cannot be exhausted into rivers or otherwise into the environment, and must be treated to remove at least predetermined levels of the impurities, and in some instances to remove the impurities entirely. Such waste water treatment is ancillary to the main purpose of preparation of battery plate material and therefore it is desirable to decrease the cost impact of this waste water treatment. Prior to impact of environmental regulations the wash medium was used only once. As a result, the impurity concentration, although too low to justify economic impurity recovery, did prevent this once used wash medium from being used for human consumption.

One useful technique in reducing the quantities of a washing medium employed is that of employing successive washes with washing media of sequentially decreasing levels of impurities so that, by the time of the last wash in the sequence, the material being washed is washed with a washing medium having relatively low level impurities. To make such a sequential washing operation successful, however, it is essential that the several washing media employed be maintained separate from one another, for if a relatively impure washing medium is allowed to mix with a relatively purer washing medium, any advantages which flow from the sequential washing step is reduced or eliminated. Such a sequential washing operation requires first that a wash tank, containing an object to be washed, be filled from a source of relatively impure washing media, a washing operation then takes place, at the conclusion of which the wash tank is drained, the drained fluid going back to the original source; the wash tank is then filled from a source of relatively purer washing medium and the wash and drain operation are repeated. This sequential filling, washing and draining takes place from the various different sources of washing media, having progressively lower levels of impurities, until the material being washed is washed with the purest washing medium available. The referred to disadvantageous mixing could occur, if the wash tank were not completely drained before it was again filled. Although use of a level sensor to signal draining of a wash tank might be considered, such a device is not usable, for practical reasons. The particular impurities which battery making operation requires, renders the available level sensors unusable, either because the impurities in the washing media would quickly clog such a level sensor and thus render it unusable, or because the particular level sensors are not suited to the environment in which battery making occurs, constituting a heavy industrial process, including relatively uncontrolled temperatures, electrical noise, etc.

As the washing process continues the impurity concentration of each of wash media increases. The process must be terminated and the wash media limited in impurity concentration in order to ensure that effective washing is possible. Desirably, however, the termination should only be temporary, the aggregate impurity level of each of the various washing media should be reduced and the sequence begun anew with as little impact as possible on the actual wash steps. Unfortunately the washing, termination and aggregate impurity reduction cannot operate on a strictly timed basis since the rate at which impurities enter the wash media fluctuates with time and so operating on a fixed time sequence would, at times terminate too early (when the aggregate impurity level was still low enough for effective washing) and at times terminate too late when aggregate impurity level had risen to the point that effective washing was no longer feasible.

Solution of these simultaneous requirements also must take into account that the washing step in the manufacturing process is one of a series of time sequential process steps which may be carried out on a plurality (N, where N is an integer of 1–10) of "lines" simultaneously although not synchronously. Accordingly therefore, the demands on the various sources can vary unpredictably over quite a wide range (for example, from simultaneously draining N wash tanks to a common tank to, at other times, simultaneously filling N wash tanks from a common tank). These sources (including the tanks) must be capable of such operation without substantial variation in rate of filling and draining since, as will be seen, the time to fill is used as the only indicator that a prior drain operation was complete.

It is therefore, one object of the present invention to provide a fluid handling system which is capable of meeting the requirements imposed by the necessity for washing battery plate material in the course of battery making, which is suitable for such an environment, but which at the same time minimizes the extent to which washing media is exhausted. It is another object of the present invention to provide such a fluid handling system which is completely automatic in operation, and which both minimizes the extent to which the different washing media are mixed in the course of sequential washing operations, and at the same time is capable of both detecting and recovering from a condition in which unwanted mixing of the different washing media is detected. It is a further object of the invention to provide such a fluid handling system which is capable of both sequentially filling and draining from 1 to N wash tanks from various tanks or sources of washing media or differing impurity concentrations, but which is also capable of sequentially cascading (transferring) the washing media employed from tank-to-tank when the impurity concentration of the tank of lowest concentration reaches a threshold, and effecting the cascade with minimum impact on the various wash operations, then in process.

SUMMARY OF THE INVENTION

In meeting these and other objects of the invention, a plurality of sources are provided, one for each different impurity concentration range employed in the sequential washing steps. Each source includes a tank of volume large in relation to the the volume of any of the wash tanks, large even in relation to the total wash tank volume (for example, about 50 times the volume of a single tank and 10 times the volume of all wash tanks) each tank feeds a valved source (or feed) line and from there to a pumped return line, the tanks located relative to the associated source line to provide a substantial head to maintain flow in the source line as a wash tank or tanks is filled. In addition, to effect the cascading operation a selected one of the sources includes a pumped and valved drain line so that, on command the selected tank can be pumped out. Each other tank includes a pumped and valved transfer line to an adjacent tank. A first or predetermined tank has a valved and pumped supply line from a source of fresh wash medium. To compensate for unexpected loss of media each source also has a makeup supply which comprises the adjacent transfer line which can be enabled to make up any unexpected losses.

Each source line is connected in common to a wash tank manifold for each pair of wash tanks, the manifold is, in turn, connected to a multiple valved wash circulate path for each separate wash tank. The wash circulate path for each wash tank is located in the immediate vicinity of the associated wash tank with the volume contained in the wash circulate path minimized. Each wash circulate path includes a double valved, pumped fill path extending from each of the source manifolds through a pump to a first tank intake, a second partially overlapping double valved pumped circulate path connected to a tank outlet and said tank intake, and a third, also overlapping double valved and pumped drain path extending between one of the interfaces and each of the source manifolds, with a single pump common to all three paths.

In operation, at an exemplary wash tank, a source manifold (or loop) valve and both fill path valves (termed supply and fill) are open and the pump started to fill the tank. After a (monitored) time in which the wash tank fills, one of the fill path valves (supply) is closed and a circulate valve is opened, such that the pump terminates filling and commences wash circulation. After a fixed time a one of the circulate valves (fill) is closed and a one of the drain valves (return) is opened so that the pump effects wash tank draining. The pumped return line assists in clearing the wash tank of wash medium. The wash drain is terminated by closing the drain valve (return) and the source manifold (loop) valve. At this time the wash tank should be substantially free of wash medium and the wash circulate path and manifold should have a minimum quantity of wash medium therein (e.g. 5–10 gallons compared to wash tank volume of 300 gallons).

The foregoing cycle is repeated starting with a different source manifold to repeat the cycle with a wash medium of lower impurity concentration to continue the wash process. After each source has supplied the wash medium for a wash operation the wash cycle is terminated and the now washed object is removed from the tank and a new object, for washing, is inserted.

Since there are plural lines, each with its own wash tank, operating independently, the sources may be unpredictably called on to fill or drain all of the wash tanks simultaneously. This should be effected with minimum variation in the fill or drain time of each tank separately. The drain time variation minimization is especially critical for the drain operation is timed; increases in drain time will leave increased quantities of residual wash media in the wash tank at the conclusion of the drain sequence. This will result in unwanted increases in mixing of wash media with different impurity concentration with accompanying unwanted effects.

After a substantial (but unpredictable) number of wash cycles a predetermined source medium has increased in impurity concentration to a predetermined level. This is detected by monitoring medium conductivity. Measurement of that condition effects a cascading operation in which a selected source is drained. The contents of an adjacent source is transferred to the empty source, and the cascade continues until the last source is drained and refilled with fresh wash medium (de-ionized water). During the cascade, there will be times during which one of the sources will be drained preventing a wash fill with respect to that source. The process controller temporarily inhibits the associated wash fill until the source is capable of filling the wash tank, at which time the controller allows the wash sequence to continue. Although the entire cascade sequence takes a substantial amount of time (measured in hours) each wash sequence (approximately ½ hours in duration) will be inhibited only once.

To effect this operating sequence a control system is provided to operate the various valves and energize and deenergize the various pumps. The control system operation is based on a combination of sensing critical process parameters and time. Since the process interrelates a single set of wash media sources with a plurality of wash tanks, each on a separate production line, the control system is divided into a main controller, for control of the pumps and valves associated with the sources, and a separate line controller for each wash tank. Each of the main and line controllers includes its own set of input channels for sensing, and a set of output channels for manifesting commands to the pumps and valves controlled thereby. The prime component of both the main and line controllers is a programmable sequencer, which can be any of a variety of such devices which are commercially available. However, it should be understood that the programmable sequencers merely provide logical control capabilities and the manner in which such capabilities are packaged is not essential. Thus, the entire control function can be packaged as a single programmable sequencer. In like manner, each or all of the the programmable sequencers can be replaced by equivalent control capability provided in the form of discrete logic circuits, relay logic circuits, or with microprocessors, minicomputers or a main frame computer. While the circuit design (of the logic circuits or relay circuits) or programming (for microprocessors or computers) may be unique, each will be determined by the control functions which will be described in detail.

With respect to the wash process, while the fill and drain are nominally timed, the control system is arranged, in respect to fill operations, to mark time in the entire fill, circulate and drain sequence if wash tank fill does not occur on time. This assures that wash operation is effected with a full tank. On the other hand, if the time to fill is too small, it is assumed that the tank was not drained sufficiently on the previous drain and a failure is noted, which may prevent normal cycle progression.

Accordingly one aspect of the invention comprises:

a method of washing an object in a wash tank with a sequence of washes with media of progressively decreasing impurity concentration, which minimizes unnecessary mixing of wash media without measuring degree of draining of the wash tank, comprising the steps of:

(a) providing plural valved sources of wash media of progressively decreasing impurity concentration, (b) filling a wash tank with a first wash medium at a relatively constant rate by opening at least a first valve associated with a source of said first wash medium, (c) terminating said filling step on detection of a determined level of wash medium in said wash tank, and closing at least one valve, (d) providing relative motion between said wash medium in said tank and said object, (e) draining said wash tank after a period of step (d), said draining step terminating a predetermined time after initiation and closing said at least a first valve, and (f) repeating in sequence steps b through e with further wash media of progressively decreasing impurity concentration.

Another aspect of the invention comprises:

an apparatus for washing an object comprising:

(a) a plurality of supply tanks, each with plural intakes and at least one outlet, each of said supply tanks containing a wash medium, with different supply tanks containing wash media of differing impurity concentrations, (b) piping loop means for each said supply tank for coupling said outlet and one of said intakes, said piping loop means including a pump and at least one loop valve, (c) at least one wash tank each with an intake and an outtake, (d) a pump for each of said wash tanks and tank piping means for each of said wash tanks coupling said pump, said intake and said outlet of said wash tank, each of said wash tank piping means including valve means for filling and draining said wash tank, (e) wash tank transfer means coupling each of said piping loop means and said wash tank piping means, and, (f) control means for energizing and deenergizing said pumps and for opening and closing said valves and said valve means for:

initiating transfer of a selected wash medium from one of said piping loop means through said wash tank transfer means and said tank piping means to fill said wash tank up to a predetermined level, said control means, in response to a level of wash medium in said wash tank reaching said predetermined level, terminating said transfer and for initiating a wash operation, said control means, following said wash operation initiating a wash tank drain operation for a predetermined period of time, said control means repeating said transfer, wash and drain operations with respect to each of said wash media other than said wash media, in a predetermined order.

BRIEF DESCRIPTION OF THE DRAWINGS

The invention will now be explained to allow those skilled in the art to make and use or practice the same in connection with the attached drawings in which like reference characters identify identical apparatus and in which:

FIGS. 1A–1C, when assembled as shown in FIG. 1E comprise a schematic of the wash medium distribution system;

FIG. 1D is a schematic of a typical wash tank and associated apparatus;

FIGS. 2A and 2B are respectively timing sequences showing operating state of various pumps and valves in the course of a cascade and wash tank sequence, respectively;

DETAILED DESCRIPTION OF A PREFERRED EMBODIMENT

Figure 1A:
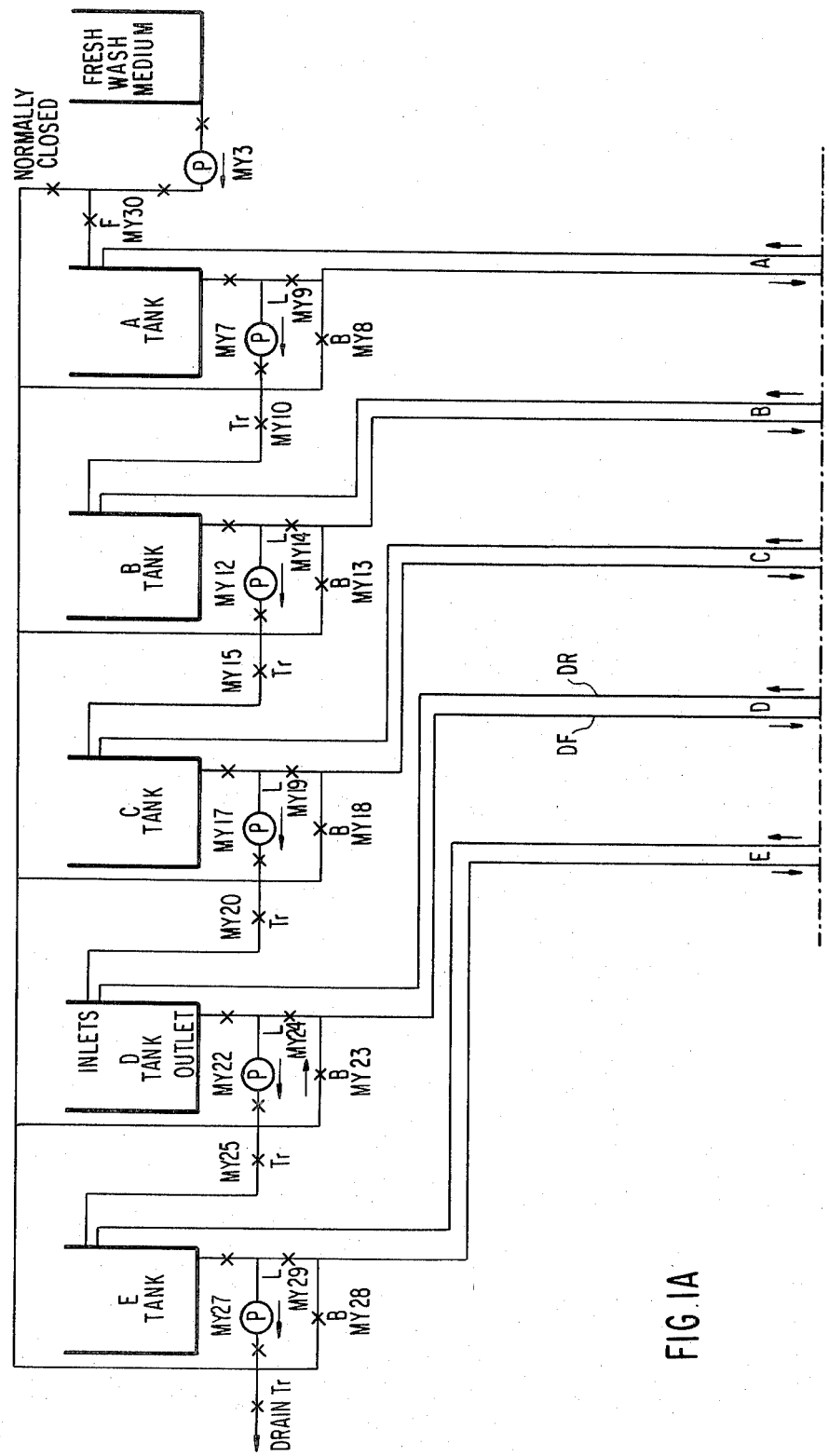

FIGS. 1A through 1B, when assembled as shown in FIG. 1E illustrate a plurality of sources of wash media, a plurality of wash tanks, and pumps, piping and valves to interconnect the same. More particularly, as shown in FIG. 1A five sources of wash media of differing impurity concentrations are illustrated comprising tanks A-E, respectively. A typical tank, such as tank D has, as is shown, a pair of inlets and an outlet. Associated with each of the tanks A-E is a piping loop comprising a feed pipe, for example DF and a return pipe, for example DR. The return pipe DR is coupled to one of the inlets of the associated tank, and the feed pipe DF is coupled to a T-joint, the other extremities of which are coupled to a loop valve L and a bypass valve B. The other end of the loop valve L is coupled through a further valve to the associated tank outlet through a second T-joint, the other extremity of which is coupled to a pump P inlet. The pump outlet is coupled through a further manually controlled valve, through an X-joint, to the inlet of a transfer valve TR, the other end of which is coupled to a second inlet of an adjacent tank designated for wash media of higher impurity concentration. The X joint is also coupled to the other end of the bypass valve B.

Referring now to FIG. 1C the other end of each of the piping loops is illustrated. As shown, the feed pipe DF is coupled through a manually controlled valve through a T-joint. One of the other ends of the T-joint is coupled through a check valve to a second T-joint. The third end of the T-joint is coupled to inlet of a pump P. The outlet of pump P is connected to a second check valve which is also connected to another end of the second T-joint and finally, the remaining end of the second T-joint is coupled to the return pipe DR. Accordingly, each tank is coupled (FIG. 1A) to a loop beginning at an outlet through the loop valve L, or alternatively through the pump P and bypass valve B to a feed pipe DF, for example, and then (FIG. 1C) through either a check valve or a further pump and further check valve to the return pipe DR, for example, which is coupled to one of the tank inlets. Although not illustrated in FIGS. 1A and 1C, the tanks are located relative to the piping loop such that a substantial gravity head exists in the feed pipe, DF, for example.

FIG. 1B illustrates the section of the loops A-E intermediate FIGS. 1A and 1C and the manner in which the piping loops are coupled to the wash tanks for the transfer of wash media therebetween, i.e., both from the loop to the wash tank, and thence from the wash tank through the loop. More particularly, selecting the D loop as representative, the feed pipe DF is coupled through a manually controlled valve, and a T-joint to a piping manifold with two extremities, each of which passes through a D loop valve to a further T-joint. Each other pipe loop is similarly connected such that associated with each wash tank is a loop valve, A-C and E (other than the D valve already referred to) each of which is coupled to its own further T-joint. A single piping pump loop is coupled to the other ends of the T-joint, and the piping loop has extremities which are coupled to a supply valve W and a return valve T. The other end of the supply valve is connected to an additional T-joint, one extremity of which is connected to the inlet of a pump P, the other extremity of which is connected to a circulate valve S. The outlet of the pump is connected through a still further T-joint, one of the ends of which is connected to the return valve T. Accordingly, under the appropriate circumstances, opening of one of the loop valves A-E provides a communicating path from the feed pipe of the associated loop into a manifold associated with the wash tank associated with the open valve. Furthermore, under still other appropriate circumstances, the wash tank may thereby be filled with the wash medium contained in the connected loop. Likewise, by appropriately operating the referred to valve, the wash tank can be drained again to a selected one of the feed pipes of the appropriate loop. As shown in FIG. 1B each loop is separately coupled to a manifold which is associated with a pair of wash tanks, such that there are as many manifolds as half the number of wash tanks (assuming there are an even number of wash tanks).

FIGS. 1A-1C employ a representation * to illustrate a valve. Those valves without reference characters are manually controlled valves which are normally open (unless otherwise indicated). They are provided so various elements can be manually isolated for service by closing appropriate valves. Check valves all carry the additional designation "Ch" with an arrow showing the allowed flow direction. The valves shown in FIGS. 1A-1C, with alphabetic reference characters are operated by the control system. Since the control system has a sequencer for each line and a main sequencer, the output channel MY (for main) or LY (for line) is also indicated for representative valves.

FIG. 1D illustrates a detail of a typical wash tank and is useful to explain the manner in which apparatus is operated so as to provide for first, filling the wash tank, then a washing operation and finally draining the wash tank preparatory to a next filling operation.

As has been made clear, desirably the wash tank is repeatedly filled and drained with washing media of progressively decreasing impurity concentration. Since as is shown in FIG. 1A, five sources of wash media are employed, this is implemented by beginning the sequence with a fill from the E loop, and after draining the wash tank back into the E loop, filling it from the D loop etc. until the wash tank is finally drained into the A loop. As is shown in FIG. 1D the wash tank has an inlet and an outlet. Associated with each wash tank are fill (R), circulate (S), supply (W), return (T) and loop valves (A-E), and appropriate piping to connect the same. Assuming the wash tank is empty, and has already been filled and drained from the E and D loops, and is about to be filled from the C loop, the fill (R) and Circulate (S) valves are open, the pump is operating, the supply (W) valve is closed, and at the conclusion of the draining operation to the loop D, the return (T) valve is closed. Immediately, thereafter, the loop C and supply (W) valves are opened and the circulate (S) valve is closed. Consequently, wash medium from the C loop is coupled through the open C valve, the open supply (W) valve, the operating pump, and the open fill (R) valve so as to fill the wash tank. After a filling is complete, indicated by a level sensor, and essentially simultaneously, the supply (W) valve is closed and the circulate (S) valve is opened. Accordingly, the wash media contained in the wash tank can now circulate from the tank outlet, through the circulate (S) valve, the pump (P) and the fill (R) valve. This provides for relative motion between wash medium and the object being washed. Following a period of washing, a drain sequence is initiated by closing the fill (R) valve and opening the return (T) valve. Accordingly, the wash medium contained in the wash tank then passes from the outlet through the circulate (S) valve, the pump (P), the return (T) valve and the loop (C) valve so that the wash medium is returned to the loop from which it originated. At the conclusion of the drain period the next filling occurs by repeating the sequence except that instead of opening the C valve, the B valve is opened. This operation is illustrated in FIG. 1D wherein the solid path illustrates the filling path from the C loop, the dash path illustrates the circulate path, and the dash dot path illustrates the drain path.

Also associated with each tank are lid opening and closing solenoids and a level sensor (LS) to sense when the tank has reached a filled condition. During normal operation, a washing sequence begins with the tank lid open; the tank is then filled with the object to be washed, as the washing sequence begins the close lid solenoid is energized to close the tank lid, and the sequence begins. At the conclusion of the washing sequence the open lid solenoid is energized to open the tank lid so that the now washed object can be removed and the next object to be washed inserted. The level sensor (LS) provides an input to a programmable sequencer along with several other inputs, and provides outputs to operate the various valves and pumps and solenoids in a manner which will be explained.

As the equipment operates and wash media is employed in washing operations, the impurity concentration levels in each of the tanks slowly increases. Initially, each tank is filled with a fresh or relatively pure wash medium such as deionized water. Since the wash tank fill sequence starts with loop E, and ends with loop A, the impurity concentration rises faster in the E tank than the others, and the impurity concentration in each tank D-A rises faster in impurity concentration than those which follow it in the sequence D-A. Thus, while the impurity concentration of the tanks A-E are different, and increase progressively from A to E, as multiple washes occur, the impurity concentration level of all tanks rise. If the impurity concentration were allowed to increase without limit, there would clearly come a point beyond which no effective washing operation could take place. To this end, apparatus is also provided for draining the tank E, and filling the tank E from the tank D, filling the now empty tank D from tank C, filling the then empty tank C from tank B, filling the empty tank B from tank A, and finally filling the empty tank A from a source of fresh wash media. This has the effect of reducing the impurity concentration in the tank A to essentially zero, and also decreasing the impurity concentration of each adjacent tank. This cascading operation is effected by opening the transfer valve TR associated with tank E and energizing the pump associated with tank E. At this time the loop valve L is maintained open; thus while the gravity head in the feed pipe EF is gradually decreased, the loop is still capable of supplying wash media. As the tank is pumped dry the feed pipe EF is depleted and the return pump (FIG. 1C) is deenergized but the other pump (FIG. 1A) continues running. After a period of time, the loop valve L and transfer valve TR are closed, the bypass valve B is opened, the pump associated with tank D (FIG. 1A) is energized and the transfer valve TR associated with the D tank is also opened. Thus, as the E tank is being pumped out, with the loop valve L closed, wash media from the D tank is being pumped, from its outlet through its pump P, through the transfer valve TR into the E tank. Of course, this means that wash media from the D tank may flow, into the E tank, out its outlet through the E tank pump P and the bypass valve B. This operation ensures that not only is the E tank depleted of the wash media originally found therein, but the piping from the E tank outlet, through the pump P to the transfer valve TR is also depleted of its wash media originally in tank E. At the same time, since the bypass valve B is open, this fluid also charges the E loop feed pipe EF under the head of pump P. After a period of time of this operation the return pump (FIG. 1C) is energized, the loop valve L is opened, the bypass valve B is closed and the pump is deenergized. However, the D tank pump, which was energized before this event is maintained energized and the D tank is pumped to the E tank. In this fashion each of the tanks A-D, has its contents transferred to the adjacent tank of higher impurity concentration, i.e., B-E. As the A tank is drained, a similar operation occurs except that the A tank is now filled from a source of fresh wash media. A detailed time sequence of this operation is shown in FIG. 2A which illustrates for each of those loops A-E operation of the pump, bypass, loop and transfer valves. FIG. 2A also shows operation of each of the loop return pumps. Generally, for the showing of FIG. 2A a pump is energized or a valve is opened when the waveform rises and the pump is deenergized or the valve is closed when the waveform falls. The single exception is the loop valve of each of the loops which is normally opened and only closed for the time indicated in FIG. 2A.

The control system which effects this operation will be described in connection with FIG. 3. The sequence shown in FIG. 2A is, as will be explained hereinafter, initiated by a single sensor measuring the conductivity of the wash medium in tank A. The sequence is fixed except that pump operation may terminate on tank level control. In a preferred embodiment which has been constructed, the horizontal axis of FIG. 2A is in time units, each division corresponding to five minutes, and the entire sequence lasting about 200 minutes.

Figure 2B:
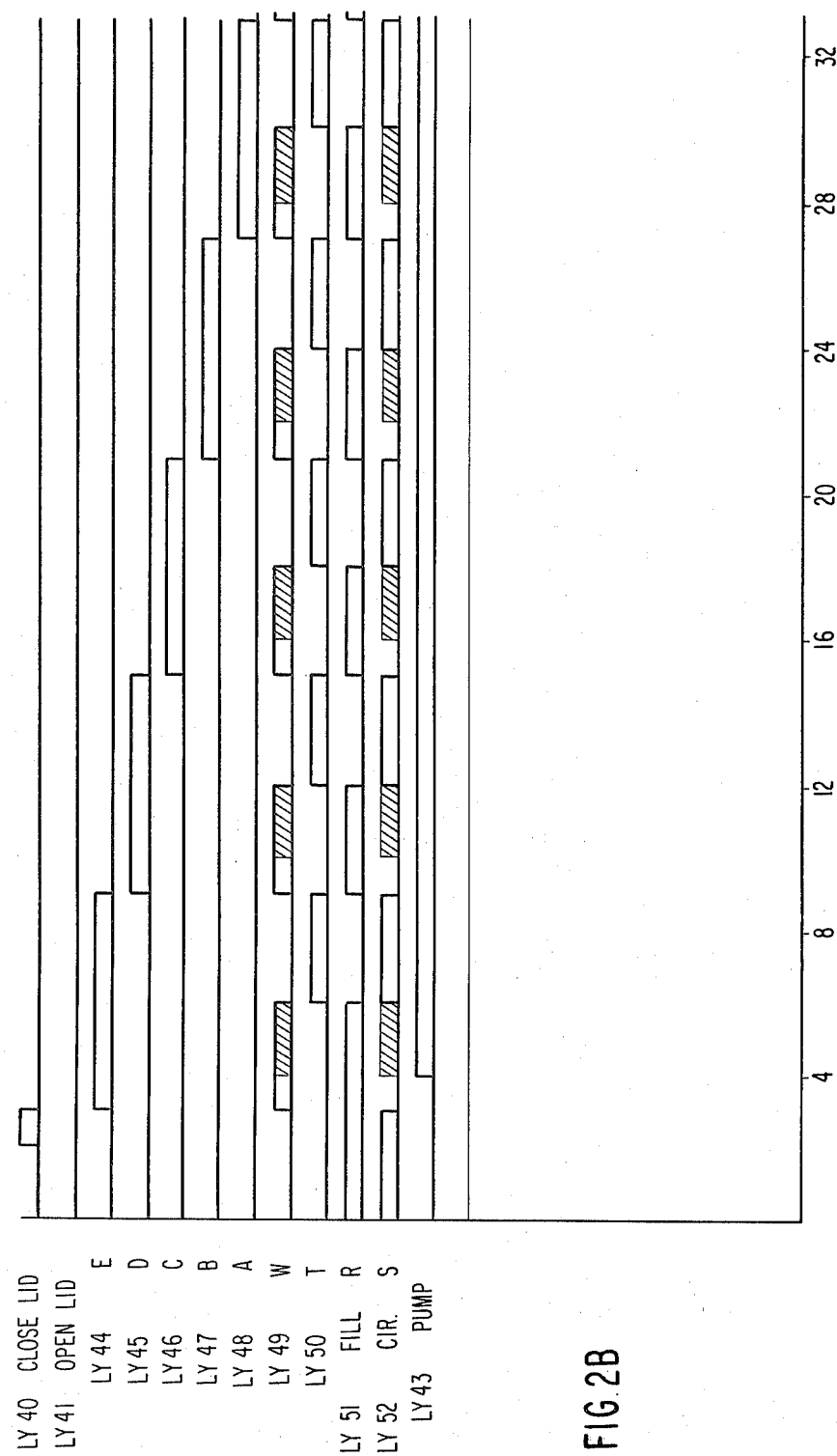

FIG. 2B illustrates a timing sequence for a typical wash tank, showing the operating sequences for the solenoids which control the opening and closing of the lid, the loop valves, supply, return, fill and circulate valves as well as the wash tank pump. In the case of FIG. 2B the typical operating sequence occupies about 32 minutes, the horizontal axis of FIG. 2B is time, with each division corresponding to a minute. The cascading sequence (FIG. 2A) is initiated entirely on conductivity measurements for the wash medium in tank A whereas the five sequential washing operations of FIG. 2B operate as a function of time (with the exception that end of the fill operation and the changing conditions of the supply (W) and circulate (S) valves is also controlled by a level sensor) and thus the two sequences may and usually do run asynchronously with respect to each other, i.e., the cascading sequence can be initiated at any point in the washing sequences. The only effect of a cascading operation is that, at some random point in time in the washing sequence, one of the wash medium sources may no longer be capable of supplying wash medium. In a manner to be explained in connection with the control system, one of the requirements for continuing a wash sequence is the filling of the wash tank. When a loop is incapable of supplying washing medium, of course the filling will terminate, and only continue when the feed pipe is charged. The effect, on a wash sequence of such an event is temporarily halting the filling. In a preferred embodiment of the invention, this temporary halting is less than 8 minutes in duration, and therefore the actual operating wash sequence (consuming about 32 minutes) is lengthened to 40 minutes so the impact of a random cascading sequence is eliminated, and thus, the length of the typical wash sequence, of 40 minutes, regardless of a simultaneous cascade, remains unchanged.

Figure 3:
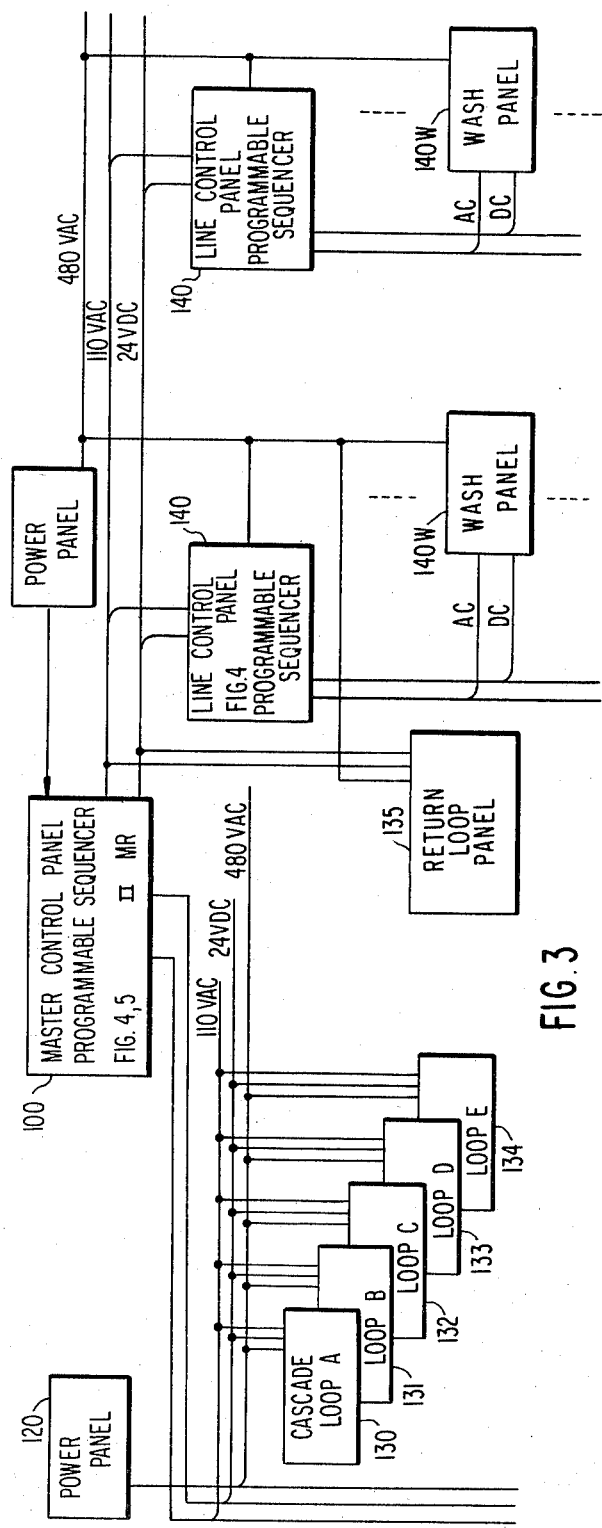
FIG. 3 is a circuit schematic of the control system.

FIG. 3 illustrates the control system which is used to operate the various valves and pumps so as to effect the previously described operation. As shown in FIG. 3, a master control panel 100 (which includes a programmable sequencer) is arranged to energize a master control relay (MR). The panel has a plurality of output conductors (at nominally 110 volt AC) and a plurality of input conductors (nominally a 24 volt DC). These two bases, along with a bus from a power panel 120 (nominally at 480 volts AC) are fed to a plurality of control panels. Of significance to this description, is the connection of these buses to cascade loop panels (130-134) for the loops A-E, as is illustrated in FIG. 3. Each loop panel (130-134) provides inputs to the master control panel corresponding to a motor starter contact, a high liquid level and low liquid level control (for the associated tank) as well as a conductivity sensor probe for the tank A. The output of the master control panel, coupled to each of the loop panels (130-134) provides for controlling the loop pump, the loop valve, transfer valve and bypass valve.

Also coupled to 110 volt and 24 volt buses is a return loop panel 135 which provides for control of the return pumps for each of loops A-E (FIG. 1C).

Each of the wash tanks is one part of a production line which includes other processing stations, which provide for pre and post processing of the object which is washed in the wash tank. Each of these production lines has an associated line control panel 140 (including its own programmable sequencer) which is also coupled to 110 volt and 24 volt buses in the master control panel. FIG. 3 illustrates two such representative production lines, although those skilled in the art will recognize that the number of production lines can be increased. Of significance in the method and apparatus of the invention, each wash tank is associated with a wash panel 140W, which provides 24 volt DC inputs to the programmable controller of the associated line control panel 140, and in return is subjected to 110 volt AC outputs from the line control panel for the control of the associated valves and pumps (FIGS. 1B and 1D).

Each of the panels 130-134, 135 and 140W include connections to valve operators and motor starters at the operating voltage as well as sensors for tank level sensing, and repeaters sensing motor and valve operator conditions. No specific showing of the apparatus is believed necessary as the apparatus itself and its manner of construction will either be apparent from the remainder of the description or capable of implementation with any of a number of conventional devices. This apparatus as well as the packaging of FIG. 3 and the voltage levels employed can be varied within wide limits, all within ordinary skill.

Figure 4:
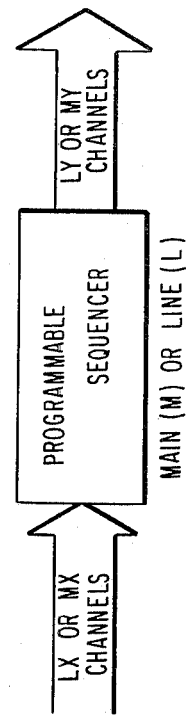
FIG. 4 is a representation of a typical programmable sequencer in the control system.

The control system characteristics are derived from the programmable sequencers, of which there is one in the master control panel 100, and one in each line control panel 140. FIG. 4 is a presentation of a typical programmable sequencer (where the prefix L or M refers to line panel or main panel), which in an embodiment of the invention which has been constructed is manufactured by Texas Instruments, Model 5. The programmable sequencer responds to a plurality of inputs (each represented by the alphabetic character, X) on an associated input channel, and provides a plurality of outputs, each on a different Y channel. The programmable sequencer controls each of the outputs based upon the logic of its programming and appropriate conditions from any of the inputs (anyone of the X channels) any of the outputs (any of the Y channels) or any of a number of temporary storage locations which are internal to the programmable sequencer. Table 1, in the attached appendix identifies the relevant inputs (X channels) for the master control panel program sequencer and the outputs (Y channels).

Table 2, also in the appendix, identifies each of the input (X channels) for each line control programmable sequencer, as well as each output (Y channels).

The program for the main control panel programmable sequencer is listed in Table 3 (also in the appendix) and the program for the line control programmable sequencer is listed in Table 4 (also in the appendix).

Before discussing the operation of either of the programmable sequencers, a brief description of the significant inputs and outputs of the main control panel programmable sequencer, and a typical line control programmer sequencer is described.

Significant signals at the main panel programmable sequencer include:

Mx4: an input from a conductivity probe in Tank A which goes to the logic 1 state when conductivity (and hence impurity concentration) in tank A exceeds the predetermined threshold; when this condition occurs the cascading operation is begun, if the level in tank A is satisfactory;

Mx5-Mx9: a power on repeater for each of loop A-E panels 130-134;

Mx13: a power on repeater for the return loop panel 135;

Mx20,21: high and low level sensors for tank A;
Mx22,23: similar sensors for tank B
Mx24,25: similar sensors for tank C
Mx26,27: similar sensors for tank D
Mx28,29: similar sensors for tank E
MY7, 12, 17, 22, 27: loop pump (P) control for loops A-E;

MY8, 13, 18, 23, 28: Bypass (B) valve control for loops A-E;

MY9, 14, 19, 24, 29: Loop (L) valve control for loops A-E

MY10, 15, 20, 25, 54: Transfer (TR) valve controls for loops A-E

MY48-52: Return pump control for loops A-E

MY79: Timer drive

MY80: 1 minute pulse

MY81: 5 minute pulse

MY82: Cascade timer pre-set

MY83: Cascade indicator

Significant signals at the line panel programmable sequence include:

LX3: repeater for power on relay

LX5: a reset switch to reset the sequencer

LX6: an emergency stop

LX11-15: repeaters for loop valves A-E

LX40: close lid pushbutton

LX41: open lid pushbutton

LX42: Auto/Manual switch

LX43: Wash Tank level sensor

LY0: Loop Module Failure

LY1: Loop Drain Failure

LY2: Cycle delay

LY5: 1 minute pulse

LY15: Timer status

LY40: Lid close solenoid control

LY41: Lid open solenoid control

LY42: Wash cycle light control

LY43: Wash tank pump control

LY44-48: Wash tank manifold loop valve (E-A) controls

LY49: Wash tank supply (W) valve control

LY50: Wash tank return (T) valve control

LY51: Wash tank fill (R) valve control

LY52: Wash tank circulate (S) valve control

A brief review of tables 3 and 4 shows that beside the X and Y channel input signals, the sequencer also responds to inputs termed on CR FGH (where F, G, and H are integers). Each such input corresponds to a memory location which can be written and read by the sequencer. The program statements themselves, therefore define the status of each such memory location at any point in the sequence.

Referring now to Table 3, which reproduces the programming of the main control panel programmable sequencer, this Table includes two columns, a line number and a command. The line number indicates the memory location at which the command is stored; in operation the programmable sequencer steps through the memory executing each command in sequence, each cycle through the memory takes 8.3 m sec. The command includes one of a number of logic operations such as AND, OR, STOR, OUTPUT, MCR or JMP. The programmable sequencer has a one bit accumulator and the logical operations AND or OR perform the logical operation between the signal identified in the command with the signal previously stored in the accumulator. The OUTPUT instruction couples the contents of the accumulator to the designated output channel. The MCR and JMP are forms of jump instructions. The MCR instruction is effective, if the accumulator contents are a logic 0, to turn to logic zero the number of following output instructions equal to the number associated with the command. If the accumulator contents are a logic one, the MCR instruction has no effect. The JMP instruction is effective only if the accumulator is a logic one, and jumps ahead a number of output instructions equal to the number associated with the instruction and sets an output to logic one, which is not yet at a logic one. This jump thus works back toward the jump instruction setting different output instructions to logic 1 on different passes.

Line numbers 0-149 and 1000-1011 provide for cascade cycle timing. The program logic (lines 29-119) simulates a 45 step shift register which, during normal operation, changes state once every 5 minutes. Thus, the various outputs of the shift register can be used to mark time to generate timed sequence control signals which are combined, with other inputs to the programmable sequencer to provide output signals to control the pumps and valves in order to effect the desired operation.

Lines 0-14 establish operation for a CR 258 which is the input pulse into the shift register. If the timer is on (CR261) CR258 changes state every 59.9 seconds, (i.e., once per minute). However, if the line timer is on and all pumps are off (Y7, Y12, Y17, Y22, Y27), then the CR 258 changes state every second (follows Y74) following the second time step (CR 302), this minimizes dead time and delays, as will be explained hereinafter.

The first five lines (0-4) implement a timing function of duration 59.9 seconds. The timing function is implemented by first storing the contents of CR 261. (The manner in which CR 261 is derived will be described hereinafter). When CR 261 is in a logic one condition, the timer is running. The resetting function for the timer is line 1, store CR $\overline{258}$. When CR 258 is energized, the timer is reset. Line 2 establishes the timing function, line 3 establishes the period, i.e., 599 unit periods (each unit a tenth of a second), and finally, line 4 initiates the timing function. When the timer expires CR 258 is changed from a 0 logic state to a 1 logic state. On the next pass through the program, after CR 258 is set to a 1 logic state, the timer is reset and the CR 258 returns to its 0 logic state, and timing can begin again assuming that the CR 261 is maintained in its 1 logic state. The other condition for energizing CR 258 to its 1 logic state, is determined by lines 5-13.

As shown by line 5, if input X79 is in its logic 1 state, the CR 258 will be set to its 1 logic state, and maintained there so long as the input X79 is so maintained. On the other hand, if the inputs Y7, Y12, Y17, Y22, and Y27 (that is, each of the loop pumps) are deenergized, after the second time step (AND CR 302) and CR 261 is in its logic 1 state, then CR 258 will follow the output Y79 which pulses once per second (as will be explained).

Lines 19-25 establish a CR 273 which is a five minute counter. A setting input for this counter is established by line 19, to store CR 258. The resetting input for the counter is established by line 20 and 21. Thus, CR 273 is in a logic 0 state for five minutes, changes state, and is reset, and counts a next five minute period.

Lines 29 through 119 provide for the shift register with the use of the jump instruction in line 31. Lines 29 and 30 provide the logical combination of CR 273 and CR $\overline{257}$. Once every 5 minutes, CR 273 is in its logic 1 state (CR 257 operation will be explained) when this logical condition is satisfied line 31 provides a jump instruction to the first (starting at line 119) of the next 44 output instructions which are not yet set to their logic 1 state and changes that state. Thus, every five minutes a different one of the sequence of the CR 301 through 344 becomes set to its logic 1 state. Tthis provides for the equivalent of a 45 stage shift register which changes state once every 5 minutes. However, reference to lines 123-128 illustrates how the shift register may be reset. Thus, lines 123 and 124 provide for the OR function between CR 328 and x110, lines 125 and 126 provide for a logical function NOT CR $\overline{302}$ and CR $\overline{261}$, and line 127 provides the logical OR function between the results of lines 125, 126 and 123,124. CR 328 is in its logic one state 28x5 minutes after the timer starts operating. Alternatively, before the second minute after timer operation CR 302 is a logic one, if also CR 261 is a logic one, CR 260 will be set to a logic one. At lines 27-28 the MCR function responds to CR 260 as a logic zero, to set to logic zero the 45 output instructions following lines 28, i.e., set each stage of the shift register to logic zero. The input x110 is a manual switch used for software maintenance, and is normally open-closing it will, of course, reset the shift register.

The final portion of the timing function is provided by lines 130-149. Lines 130-135 provide for CR 261, which has to be in its logic 1 state in order to maintain the timer running. Lines 130-134 provide the inputs to maintain CR 261 in its logic 1 state. The inputs (X4 and X20) examined at lines 130 and 131 determine conductivity and liquid level of tank A. Thus, if the conductivity of tank A is above the threshold (making x4 a logic one) and assuming liquid level is high enough to make x20 and CR 328 is not in its logic 1 state but CR 289 is, then the cascade timer is initiated. Input X20 requires the liquid level in tank A to be high enough before the cascade operation will begin. Assuming the level is made up and conductivity limits are exceeded then the timer will start, and once it reaches the second time step (CR 302) it will not stop until it gets to the 28th time step (CR 328). Thus, the conductivity measurement must remain stable 10 minutes (two time steps) before cascade operations is fully begun.

CR 289 checks power availability at each loop panel, and can stop the timer, or prevent its initiation if power is not available at any loop panel.

Lines 136 and 137 provide for a one minute pulse, lines and 138 and 139 provide for a five minute pulse. Lines 140 and 141 provide for a cascade timer preset which follows CR 261. Lines 142 thorough 147 provide a cascade counter for counting the number of cascading operations from 0 to 1,000, and lines 148,149 provide a cascade indicator, indicating cascading operations in progress, which begins with the second time step (CR 302).

Lines 208 through 253 provide control for the loop A pump, bypass valve, transfer valve, loop valve. Similarly, lines 258 through 303 provide the same functions for the loop B. Lines 308 through 353 provide the same functions for loop C. Lines 358 through 403 provide the same functions for loop D. Before discussing these, however, we will start with lines 410 through 441 which provide these functions for loop E.

Lines 410, 411 establish a MCR instruction, which is dependent on the power repeater input Mx9.

The loop E pump is controlled by output Y27 (at line 422). Normally the pump is under time control. At the second time step, when CR 302 goes to its logic 1 level, and before the 8th time step (CR 308) the loop E pump comes on unless there is a power failure (CR 289) or low level (CR 281). Thus, the pump will stay on from the second time step through the 8th time step. If the cascade timer is on and the loop D transfer valve is open (Y25), then the loop E pump will also come on. This ensures that even in the event of a failure of CR 302, the loop E pump will be on. Lines 423 through 430 establish a three step counter counting 1 minute steps. This will turn off the E loop pump three minutes after the low level sensor trips (X29) if the loop D transfer valve (Y25) does not open. Lines 431 through 433 control the loop E bypass (B) valve which is on from time step 7 to 8. Lines 440 and 441 control the loop valve which must be closed when the bypass valve is open. Lines 435 through 437 control the loop A fill valve, and will be discussed hereinafter.

Turning now to the loop D tank logic lines 358-359 provide an MCR instruction similar to lines 410-411 (loop E). Lines 363 thorough 369 control the loop D pump. This control is similar to the loop E pump except that it is normally on until time step 13. Normally, it comes on with the loop D transfer valve (MY25) but remains on (until time step 13) if the loop transfer valve (MY20) is on. Lines 370-378 establish a 3 minute counter which can turn off the loop D pump if low level sensor (X27) in the loop D tank is made for 3 minutes in the absence of the loop C transfer valve closing (MY20). Lines 378 through 380 control the loop D bypass valve which is on from time step 12 to 13. The loop D transfer valve is controlled from line 381 through 395. Lines 381-389 establish a four minute counter, which begins to count at time step 06 and is reset at time step 12. This counter will time out at the last minute of time step 06 (since each step is five minutes in duration), thus the loop D transfer valve (MY25) is on from the last minute of time step 06 to 12. Lines 389-395 will hold the valve energized, once made before the second time step ($\overline{CR\ 302}$) if loop E high level sensor is opened ($\overline{MX28}$). Once this occurs the loop D transfer valve will remain open for the duration of the make up timer (CR 295) to be discussed now.

The make up timer is established at lines 396-401 and times 150 time units (tenths of a second). Thus, if level of tank E is below the high level sensor and cascading is not in effect, some of the medium of tank D are transferred to tank E to make up the level, in 15 second increments.

Lines 402-403 require the loop valve (normally open) to change state when the bypass valve 423 does.

The logic for tanks A, B and C, lines 208-253, 258-303 and 308-353, respectively is entirely similar.

Returning now to the loop E tank logic, lines 435-437 control valve Y30, which is on when pump Y3 is on. Pump Y3 is controlled by lines 175-186. Lines 175-180 establish a four minute counter, starting at time step 26. Thus, the counter reaches its fourth step, one minute before the end of step 26, and at the time the pump is energized (assuming tank A high level is not made-$\overline{X20}$). The pump Y3, and valve Y30 remain on until the end of the cascade (CR 260) or until tank A high level is made ($\overline{X20}$). Lines 181-182 and 196-206 enable the pump Y3 and valve Y30 to make up level of A tank prior to the 20th time step in a cascading operation. In such event the counter (lines 196-201) counts for 210 unit periods of two seconds, or until A tank high level (X20) is made.

Lines 475-494 provide control signals for the return loop panel 135 to control return pumps for the loops A–E. Lines 475-476 provide an MCR instruction to turn Y48-Y52 to logic zero (pumps off) if the return loop power is absent (X13). Otherwise each return loop pump is energized so long as the associated loop's low level sensor (X21, X23, X25, X27, X29) is made indicating more than a minimum wash medium level in the tank.

Lines 510 to 532 establish a cascade failure (Y72) which can come on any time after the second time step (CR 302) if any one of the five logic conditions established by lines 510-512; 513-515; 517-519; 521-523 or 525-527 is true. Lines 510-512 is true is after the 27th time step (CR 327) transfer valve Y30 is open and the low level is made (X21). Likewise, for the E loop, if at time step before 307 ($\overline{CR\ 307}$), the loop D transfer valve is open (Y25) and the low level sensor is made (X29). Similar consideration hold for each of loops B (lines 513-515) C(517-519) and D (lines 521-523).

A cascade transfer failure (Y72) is used in the development of CR 289 in lines 550-567. Lines 550-559 use power available repeaters X5-X9, X12 and X13 along with absence of cascade failure ($\overline{Y\ 72}$) to set CR 289 to its logic one state. Absence of any one of these conditions will put CR 289 to its logic zero state with effects that should be apparent (each of the loop pumps and the timer itself is de-energized). A timer delay (Y 71) is developed to follow $\overline{CR\ 289}$ in lines 568-569.

Lines 1000-1011 establish Y79 and CR 256, (line 1000) is hard wired so it is always closed. The timer (1000-1004) times 10 time units of 0.1 sec. each, and so times out once per second to change the state of Y79 from logic zero to one. Likewise, timer 1005-1010 times a similar period beginning with Y79 going to logic one. When CR 256 goes to logic one, the first timer is reset ($\overline{CR\ 256}$), and so Y79 and CR 256 are each at logic one and zero for successive 1.0 second periods, in a phase displaced relation.

Figure 5:
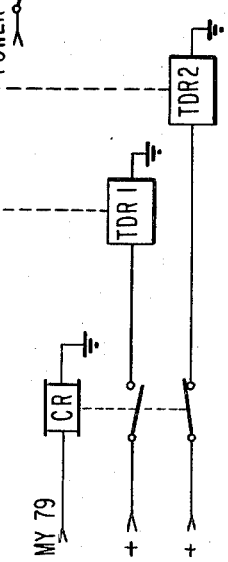
FIG. 5 is a schematic of a MR circuit and its connection to the main panel programmable sequencer, of main panel 100.

FIG. 5 is a circuit diagram for the MR relay in the main panel 100. Positive energy is supplied through an ON/OFF switch S1, the normally closed contacts of an emergency push button, through front contacts of relays TDR1 and TDR2 to energize MR, MY79 is used to energize CR. Since MY79 pulses, one second on and one second off, so does CR. Back contacts of CR connect a source of energy to the coil of TDR1, and front contacts of CR connect energy to the coil of TDR2. TDR1 and TDR2 are time delay relays, which, once energized, will drop away if no current is supplied in about 2 seconds. Thus, as long as MY79 and CR cycles in less than the delay time, TDR1 and TDR2 will remain energized to allow MR to pick. Front contacts of MR supply AC energy to the pumps, valves, etc., so that it must be energized. Since the actions which cause MY79 to cycle are at lines 1000-1011, each increment of the timers (lines 1000-1004 and 1005-1010) only occurs when the sequencer has completed each preceding program step. The sequencer must complete the program in no more than 0.1 seconds or the programmable timers will not properly time. Failure at these timers will lengthen the duration of the MY 79 pulse output, and if this pulse duration exceeds the delay time one of the TDR1 or TDR2 will drop away, dropping MR and shutting the system down. Since the circuit of FIG. 5 requires dynamic operation of CR, no static programmer output can falsely maintain MR.

As shown in FIG. 4, the line programmable sequencer includes a plurality of LX input channels, identified in Table 2. Table 2 identifies the source of each of the individual channels which are pertinent to controlling the wash tank operating cycle. The output of the line programmable sequencer comprises a plurality of LY channels, also shown generally in FIG. 4, the apparatus which each of these channels control individually is also detailed in Table 2.

The program, which controls the programmable sequencer is shown in Table 4. This program, like the program controlling the main panel programmable sequencer, includes two items of information, first a line number which is the address in the memory at which the command is stored, and the command itself. The commands, such as AND, OR, STOR, OUTPUT, MCR or JMP have already been discussed.

The line programmable sequencer program, shown in Table 4 comprises that portion of the line programmable sequencer program employed in an operating embodiment of the invention, which is pertinent to control of the wash tank operation. This program can be broken down into two portions, the first portion which establishes the timer and shift register, and a second portion which examines the appropriate inputs, performs the appropriate logical operations and outputs appropriate signals. The first portion, referred to, comprises line numbers 12–143 and 1000–1011.

This timer is generally similar to the main sequencer except that the unit timer steps are CR 258 (1 minute) whereas in the main sequencer the unit steps are CR 273 (five minutes).

Referring in detail now to lines 12–19, these commands establish a 599 time unit timer, wherein each unit is 0.1 seconds and thus, the operating sequence of control relay 258 is off for 59.9 seconds, and on for 0.1 seconds.

Lines 25–28 establish a jump instruction which is executed whenever CR 258 is in the logic 1 condition (that is once out of 599 passes, each pass occupying 0.1 seconds) so long as CR 257 is not in a logic 1 state. Thus, assuming CR 257 is not in a logic 1 state, the shift register, implemented at lines 29–118, changes state once per minute. The status of the shift register or timer can be determined by the state it is in; for example, if CR 319 is in a logic zero state and CR 318 is in a logic one state, then the shift register has been operating for 18 minutes from its initial condition. Lines 119–120 provide a logic 1 condition once per minute which is shifted through the shift register starting at CR 301. Lines 122–125 provide for halting the shift register either with a power available repeater X5, or an auto/manual switch X42, and also provide for halting the shift register at 33 minutes into the timing operation.

Lines 126–127 provide for a one minute pulse, by repeating CR 258.

Lines 135–143 establish the condition of the timer, i.e., as timing or not. Based on the status of X5, the emergency stop switch X6, a closed lid solenoid Y41 and the closed lid pushbutton X40. Once the timer is on, it latches past the closed solenoid Y41 and closed pushbutton X40.

The remaining portion of the programming aside from lines 1000–1011 (which are similar to the main panel sequencer) including lines 401–822 and 910–934 to control wash tank operations.

Lines 401–425 establish CR 287 and control Y2. CR 287 operates to inhibit timer operation (see lines 135–143) and Y2 simply repeats CR 287 as an indicator to the effect that the line cycle has been delayed. In general, pairs of lines (401,402; 403,404; 406,407; 409,410 and 412,413) require that each of the wash tank filling operations is appropriately completed. If, in any one of these five fills, filling is not complete at the appropriate time then the logical condition established by one of these pairs of lines will be fulfilled. In addition, X43 will be in the logic zero state, since the tank is not filled and thus, CR 287 will be put to the one logic state. So long as the tank remains unfilled the one logic state of CR 287 is maintained via line 415, once it is switched to the one logic state. Only when the tank becomes filled is CR 287 set to logic zero and the timer again allowed to run. At any time, if power to the wash tank is removed then line 418 provides for switching CR 287 to the one logic state. Finally, lines 422 and 423 provide that when CR 287 is in the one logic state the Y2 output is also in the one logic state to energize a corresponding indicator. Accordingly, it should be apparent that the commands in lines 401–419 provide for inhibiting continued operation of the line timer in the event that any one of the wash cycles is not completed on schedule.

On the other hand, lines 430–451 check to ensure that filling takes at least 60 seconds. The 60 second period is timed for each fill that is beginning at 3, 9, 15, 21 and 27 minutes into the cycle. If filling has occurred before the 4th, 10th, 16th, 22nd or 28th minutes into the cycle, then the fill operation took less than one minute. This will result in setting a timer (lines 446-448) which times a two second period (20 units of 0.1 sec.) this is to "filter" out extraneous noise. If this condition (of fill in less than 60 seconds) is maintained for two seconds, i.e., before the 4th 10th, 16th, 22nd and 28th minutes into the cycle, then line 451 sets CR 290 to a logic one condition. In addition, lines 454 and 455 set the drain failure indicator (Y1). CR 290 and drain failure indicator Y1 can only be reset by operation of the manual reset switch at the main console (X5).

The drain failure (and CR 290) are significant indicators in the process for filling a wash tank in less than 60 seconds implies that the previous drain left excess medium in the tank. The drain failure condition, in requiring a manual reset (X5) requires operator attention since without operator attention the wash tank lid will not open and can also be used as a signal that maintenance, to correct the condition causing the drain failure, is required.

However, the program, as shown in Table 4, allows the wash tank contents (with the excess previous wash medium) to be drained back to the source. To prevent this operation, i.e., to stop the wash sequence on detection of drain failure, rather than at the end of the entire wash sequence, the command at line 143 is moved to line 144 and the new command AND NOT CR 291 is inserted at line 143. This has the effect of stopping the timer on detection of a drain failure and prevents the contaminated wash medium in the tank from being automatically drained to a (perhaps) inappropriate source.

Lines 460–499 provide for setting CR 291 to the logic one state if any two loop valves are open at the same time (for a duration of at least 2 seconds). This is effected by ANDing the loop valve repeater contacts X11-X15 in each possible pair. CR291 is maintained in the logic one state thereafter, via line 494. Alternatively, if a loop drain failure indicator Y1 is set to the logic one state, that alone will provide for setting CR 291 to the logic one state at line 495. A loop module failure indicator Y0 is provided, set to the logic one state by the logic one state of CR 291, lines 498–499, to repeat the condition of CR 291. Once set CR 291 can only be reset by the manual reset (X5).

Reference to lines 518–525 indicates that the lid open solenoid (LY41) cannot be set to the logic one state if CR 291 is in the logic one state. Thus, if any two or more loop valves are open simultaneously or if a wash tank fill takes less than 60 seconds, the wash tank lid remains locked and a loop failure module indicator Y0 is lit to indicate the failure.

Lines 557-563 provide a cycle light, this light is flashing when the tank is full, and other times, but before the end of the cycle, is on steadily, at the end of the cycle the light is off.

Lines 600-606 control the fill and circulate valves (R and S, respectively). The fill valve is a normally open valve and when channel Y51 is set to the logic one state the valve is closed. Likewise, the circulate valve is normally open and when the channel Y52 is set to the logic one state, the valve is closed. These valves are controlled respectively, by the output channels Y50 and Y49 corresponding to the return and supply valves, respectively.

Lines 634-636 control the wash tank pump, as indicated the pump is on, starting at the third minute of the cycle until the 33rd minute.

Lines 660 through 671 control the supply valve (W). As is apparent, the valve is controlled solely by timing, assuming that CR 274 is in a logic one state.

CR 274 is provided at lines 673 through 678 and is provided to be in its logic one state if the wash tank is empty for a period of 10 seconds (100 time units of 0.1 seconds), the timer provided at line 673-677 thus times out a 10 second period, and if the wash tank remains not full, then CR 274 is set to its logic one condition to allow the supply valve Y49 to open, at the appropriate time points in the cycle. When the wash tank is filled, however, CR 274 is maintained at logic 0 to close the supply (W) valve.

Lines 680 through 690 provide control over the return valve (Y50), and this is solely a time function, i.e., the valve is open from the 6th to the 9th minutes, then from the 12th to the 15th minutes, then from the 18th to the 21st minutes, open again from the 24th to the 27th minutes and finally, open from the 30th to the 33rd minutes.

The loop E valve (channel LY44) is controlled also on a time basis from lines 720 through 722. Similarly, the loop D valve (LY45) is also controlled on a time basis, see lines 750-752. The loop valves C, B and A (channels LY46, 47 and 48, respectively) are controlled in a similar fashion, although at other points in the cycle, see lines 770-772, 790-792 and 810-812.

Finally, lines 910-934 provide an indicator Y79, Y80, Y82, Y83, Y84 for detecting the loop on which a drain failure occurred. These lines provide paired commands at 910-911, 915-916, 920-921, 925-926 and 930-931, which satisfy a logical condition only in the first minute of the filling operation and then only if the tank is filled. Depending on which loop this occurs on, either channels LY79, LY82, LY83 or LY84 will be in a logic one state.

From the foregoing operation of the wash media handling system will be apparent to those skilled in the art, a brief summary is provided below.

BRIEF SUMMARY OF OPERATION

With each of the tanks A-E initially filled, each of the piping loops associated therewith will also be filled, and each of the return pumps will be energized. Since each of the tanks are filled, and since we have also assumed that no washing operation has yet taken place, the conductivity test for impurity concentration, in the A tank, will indicate impurity concentration below threshold and, accordingly, the cascade timer will not be running. On the other hand, the line programmable sequencer will begin to run once the closed wash tank lid pushbutton (X40) is made (lines 135-143). This initiates the sequence shown in FIG. 2B wherein first a loop valve (E-A) is opened along with the supply (W) valve, and the circulate (S) valve is closed. Accordingly, the wash tank begins to fill. During the filling operation the number of loop valves open is continuously monitored to ensure that only a single one of the loop valves are open at any one time. In addition, the filling time is also monitored, and if fill occurs in less than 60 seconds a loop drain failure is indicated. With the program of the form shown in Table 4, once a loop drain failure is indicated, the wash sequence will terminate, after all five washes and require manual resetting to ensure the operator's attention has been called to the loop drain failure. In the modification previously suggested, a loop drain failure will terminate operation of the timer and thus require immediate attention. In the event that filling requires more than 60 seconds, a supply valve (W) is closed when the wash tank is filled (Lines 673-678). If filling does not occur on time, the timer is inhibited until filling does occur. With the supply (W) valve closed, further filling is prevented, and on a time basis other appropriate valve changes are made to allow the wash media to be circulated by the pump. The circulation is effected on a timed basis, at the end of the circulation period, other valve changes are made including opening the return (T) valve. Since the loop valve is maintained open, the wash media is returned to the source or tank from which it was obtained. This identical sequence is repeated until each of five fills, circulates and drains are completed, with identical checks made during each operation. At the termination of the sequence the lid can be opened by operating the open lid pushbutton (X41). The now washed object can be removed, and a new object to be washed inserted, and the lid closed again to initiate an identical sequence.

If during one of the fill operations mentioned above, a cascade is in process, and the tank from which the wash tank is being filled has been pumped dry, of course the fill will not be completed on time, but it has already been indicated, this will merely inhibit the line timer until the fill is properly completed. A review of FIG. 2A indicates that during the cascading operation the return pumps are off for two time steps, i.e., 10 minutes. However, the supply line remains charged for some of this time, and in fact, the maximum amount of time that a wash flow is not immediately available is only 8 minutes. Therefore, the normal 32 minute wash sequence cycle can at most be delayed by an additional 8 minutes in the event of a simultaneous cascade.

Returning now to the main panel sequencer, cascading will be effected on conductivity (and hence impurity concentration) exceeding the preset threshold, which in an embodiment of the invention which has been constructed, is conductivity in excess of 1750 micromhos. When that is detected, and assuming the tank in which the test is made (tank A) is filled, the main panel timer is initiated, and this initiates the sequence shown in FIG. 2A. In effect, tank E is drained, and at the end of the draining operation the transfer pump for tank D is enabled and the contents of tank D pumped into tank E, after appropriate valving changes to ensure that, as tank E begins to fill with the contents from tank D, the EF line is charged through the bypass valve (B)

of tank E. Beginning at the second time step of FIG. 2A, however, one or more of the pumps is on continuously and so each of the time steps shown are actually 5 minutes in duration.

The sequence associated with draining tank E and transferring the contents of tank D to tank E is repeated with each of the other tanks and tank A refilled from a source of fresh wash media (deionized water).

While the specific pumps, valves, pipe sizing, tank sizing and other parameters have not been set forth in detail, those of ordinary skill in the art will be able to determine appropriate size parameters based upon the contents of a single wash tank, and the total number of wash tanks which will be operating simultaneously. In one embodiment of the invention which has been built and is now operating, the various components are listed below:

| | |
|---|---|
| All sequencer controlled valves: | Pneumatically operated electrically controlled |
| Supply Tanks: | 15,000 gallon capacity, each |
| Feed and Return Pipes: | 6" diameter |
| Transfer Pipe: | 3" diameter |
| Wash tank loop manifolds, and associated piping: | 3" diameter |
| All Pumps: | Centrifugal, electrically powered |
| Wash Tank Capacity: | 300 gallons |

APPENDIX

TABLE 1

| MAIN PANEL | |
|---|---|
| MX4 | Conductivity Test Limit |
| MX5 | Auto/Manual Loop A |
| MX6 | Auto/Manual Loop B |
| MX7 | Auto/Manual Loop C |
| MX8 | Auto/Manual Loop D |
| MX9 | Auto/Manual Loop E |
| MX13 | Auto/Manual Return Loop |
| MX20 | Loop A HLC |
| MX21 | Loop A LLC |
| MX22 | Loop B HLC |
| MX23 | Loop B LLC |
| MX24 | Loop C HLC |
| MX25 | Loop C LLC |
| MX26 | Loop D HLC |
| MX27 | Loop D HLC |
| MX28 | Loop E HLC |
| MX29 | Loop E LLC |
| MX43 | Thermostat A |
| MX44 | Thermostat B |
| MX45 | Thermostat C |
| MX46 | Thermostat D |
| MX47 | Thermostat E |
| MX79 | Pushbutton for Software Maintenance |
| MX109 | Pushbutton |
| MX110 | Pushbutton |
| MY2 | Line Delay |
| MY7 | Loop A Pump (P) |
| MY8 | Loop A Bypass Valve (B) |
| MY9 | Loop A Loop Valve (L) |
| MY10 | Loop A Transfer Valve (Tr) |
| MY12 | Loop B Pump (P) |
| MY13 | Loop B Bypass Valve (B) |
| MY14 | Loop B Loop Valve (L) |
| MY15 | Loop B Transfer Valve (Tr) |
| MY17 | Loop C Pump (P) |
| MY18 | Loop C Bypass Valve (B) |
| MY19 | Loop C Loop Valve (L) |
| MY20 | Loop C Transfer Valve (Tr) |
| MY22 | Loop D Pump (P) |
| MY23 | Loop D Bypass Valve (B) |
| MY24 | Loop D Loop Valve (L) |
| MY25 | Loop D Transfer Valve (Tr) |

TABLE 1-continued

| MAIN PANEL | |
|---|---|
| MY27 | Loop E Pump (P) |
| MY28 | Loop E Bypass Valve (B) |
| MY29 | Loop E Loop Valve (L) |
| MY30 | Loop A Fill Valve (F) |
| MY48 | Loop A Return Pump |
| MY49 | Loop B Return Pump |
| MY50 | Loop C Return Pump |
| MY51 | Loop D Return Pump |
| MY52 | Loop E Return Pump |
| MY54 | Loop E Transfer Valve (Tr) |
| MY79 | Timer Drive |
| MY80 | 1 Minute Pulse |
| MY81 | 5 Minute Pulse |
| MY82 | Cascade Timer Pre-Set |
| MY83 | Cascade Indicator |
| MY84 | Cascade Counter |

TABLE 2

| LINE PANEL | |
|---|---|
| LX3 | Power Relay, Wash Tank |
| LX5 | Reset |
| LX6 | Emergency Stop |
| LX7 | Hard Wired |
| LX11 | Loop E (LY44) |
| LX12 | Loop D (LY45) |
| LX13 | Loop C (LY46) |
| LX14 | Loop B (LY47) |
| LX15 | Loop A (LY48) |
| LX40 | Close P.B. |
| LX41 | Open P.B. |
| LX42 | Auto/Manual |
| LX43 | Tank LLC |
| LX44 | Tank Thermostat |
| LY0 | Loop Module Failure |
| LY1 | Wash Drain Failure |
| LY2 | Cycle Delay |
| LY5 | 1 Minute Pulse |
| LY15 | Timer Status |
| LY40 | Close Solenoid, Wash Tank |
| LY41 | Open Solenoid, Wash Tank |
| LY42 | Wash Cycle Light |
| LY43 | Wash Pump |
| LY44 | Loop E Valve |
| LY45 | Loop D Valve |
| LY46 | Loop C Valve |
| LY47 | Loop B Valve |
| LY48 | Loop A Valve |
| LY49 | Supply (W) |
| LY50 | Return (T) |
| LY51 | Fill (R) |
| LY52 | Circulate (S) |
| LY63 | Timer Drive |

TABLE 3

| NO. | COMMANDS |
|---|---|
| 0 | STR CR 261 |
| 1 | STR NOT CR 258 |
| 2 | TMR |
| 3 | 599 |
| 4 | + |
| 5 | OR X 79 |
| 6 | STR Y79 |
| 7 | AND NOT Y7 |
| 8 | AND NOT Y12 |
| 9 | AND NOT Y17 |
| 10 | AND NOT Y22 |
| 11 | AND NOT Y27 |
| 12 | AND CR 302 |
| 13 | AND CR 261 |
| 14 | OR STR |
| 15 | OUT CR 258 |
| 19 | STR CR 258 |
| 20 | STR NOT CR 273 |
| 21 | AND NOT X110 |
| 22 | CTR |
| 23 | 5 |

TABLE 3-continued

| NO. | COMMANDS |
|---|---|
| 24 | + |
| 25 | OUT CR 273 |
| 27 | STR NOT CR 260 |
| 28 | MCR 45 |
| 29 | STR CR 273 |
| 30 | AND NOT CR 257 |
| 31 | 44 |
| 32 | STR CR 343 |
| 33 | OUT CR 344 |
| 34 | STR CR 342 |
| 35 | OUT CR 343 |
| 36 | STR CR 341 |
| 37 | OUT CR 342 |
| 38 | STR CR 340 |
| 39 | OUT CR 341 |
| 40 | STR CR 339 |
| 41 | OUT CR 340 |
| 42 | STR CR 338 |
| 43 | OUT CR 339 |
| 44 | STR CR 337 |
| 45 | OUT CR 338 |
| 46 | STR CR 336 |
| 47 | OUT CR 337 |
| 48 | STR CR 335 |
| 49 | OUT CR 336 |
| 50 | STR CR 334 |
| 51 | OUT CR 335 |
| 52 | STR CR 333 |
| 53 | OUT CR 334 |
| 54 | STR CR 332 |
| 55 | OUT CR 333 |
| 56 | STR CR 331 |
| 57 | OUT CR 332 |
| 58 | STR CR 330 |
| 59 | OUT CR 331 |
| 60 | STR CR 329 |
| 61 | OUT CR 330 |
| 62 | STR CR 328 |
| 63 | OUT CR 329 |
| 64 | STR CR 327 |
| 65 | OUT CR 328 |
| 66 | STR CR 326 |
| 67 | OUT CR 327 |
| 68 | STR CR 325 |
| 69 | OUT CR 326 |
| 70 | STR CR 324 |
| 71 | OUT CR 324 |
| 72 | STR CR 323 |
| 73 | OUT CR 324 |
| 74 | STR CR 322 |
| 75 | OUT CR 323 |
| 76 | STR CR 321 |
| 77 | OUT CR 322 |
| 78 | STR CR 320 |
| 79 | OUT CR 321 |
| 80 | STR CR 319 |
| 81 | OUT CR 320 |
| 82 | STR CR 318 |
| 83 | OUT CR 319 |
| 84 | STR CR 317 |
| 85 | OUT CR 318 |
| 86 | STR CR 316 |
| 87 | OUT CR 317 |
| 88 | STR CR 315 |
| 89 | OUT CR 316 |
| 90 | STR CR 314 |
| 91 | OUT CR 315 |
| 92 | STR CR 313 |
| 93 | OUT CR 314 |
| 94 | STR CR 312 |
| 95 | OUT CR 313 |
| 96 | STR CR 311 |
| 97 | OUT CR 312 |
| 98 | STR CR 310 |
| 99 | OUT CR 311 |
| 100 | STR CR 309 |
| 101 | OUT CR 310 |
| 102 | STR CR 308 |
| 103 | OUT CR 309 |
| 104 | STR CR 307 |
| 105 | OUT CR 308 |
| 106 | STR CR 306 |
| 107 | OUT CR 307 |
| 108 | STR CR 305 |
| 109 | OUT CR 306 |
| 110 | STR CR 304 |
| 111 | OUT CR 305 |
| 112 | STR CR 303 |
| 113 | OUT CR 304 |
| 114 | STR CR 302 |
| 115 | OUT CR 303 |
| 116 | STR CR 301 |
| 117 | OUT CR 302 |
| 118 | STR CR 258 |
| 119 | OUT CR 301 |
| 120 | STR CR 273 |
| 121 | OUT CR 257 |
| 123 | STR CR 328 |
| 124 | OR X 110 |
| 125 | STR NOT CR 302 |
| 126 | AND NOT CR 261 |
| 127 | OR STR |
| 128 | OUT CR 260 |
| 130 | STR X 4 |
| 131 | AND X 20 |
| 132 | OR CR 302 |
| 133 | AND NOT CR 328 |
| 134 | AND CR 289 |
| 135 | OUT CR 261 |
| 136 | STR CR 258 |
| 137 | OUT Y80 |
| 138 | STR CR 273 |
| 139 | OUT Y81 |
| 140 | STR CR 261 |
| 141 | OUT Y82 |
| 142 | STR CR 327 |
| 143 | STR NOT Y8 |
| 144 | CTR |
| 145 | 999 |
| 146 | + |
| 147 | OUT Y84 |
| 148 | STR CR 302 |
| 149 | OUT Y83 |
| 175 | STR CR 258 |
| 176 | AND CR 326 |
| 177 | STR NOT CR 260 |
| 178 | CTR |
| 179 | 4 |
| 180 | + |
| 181 | STR NOT CR 320 |
| 182 | AND NOT CR 275 |
| 183 | OR STR |
| 184 | AND NOT X 20 |
| 185 | AND CR 289 |
| 186 | OUT Y 3 |
| 187 | STR NOT Y3 |
| 188 | AND NOT X 18 |
| 189 | |
| 190 | OUT Y4 |
| 191 | |
| 192 | |
| 193 | |
| 194 | |
| 195 | |
| 196 | STR Y3 |
| 197 | AND Y79 |
| 198 | STR Y3 |
| 199 | CTR |
| 200 | 210 |
| 201 | + |
| 202 | |
| 203 | STR CR 275 |
| 204 | AND NOT X 18 |
| 205 | OR STR |
| 206 | OUT CR 275 |
| 208 | STR X 5 |
| 209 | MCR 6 |
| 210 | STR X 43 |
| 211 | AND X 21 |
| 212 | OUT Y6 |
| 213 | STR Y30 |
| 214 | AND CR 261 |

TABLE 3-continued

| NO. | COMMANDS |
|---|---|
| 215 | OR Y10 |
| 216 | AND NOT CR 277 |
| 217 | AND NOT CR 328 |
| 218 | AND CR 289 |
| 219 | OUT Y7 |
| 220 | STR CR 258 |
| 221 | AND NOT X 21 |
| 222 | STR NOT Y30 |
| 223 | AND NOT X 110 |
| 224 | CTR |
| 225 | 3 |
| 226 | + |
| 227 | OUT CR 277 |
| 228 | STR CR 327 |
| 229 | AND NOT CR 328 |
| 230 | OUT Y8 |
| 231 | STR CR 258 |
| 232 | AND CR 321 |
| 233 | CR NOT CR 327 |
| 234 | AND NOT X 110 |
| 235 | CTR |
| 236 | 4 |
| 237 | + |
| 239 | STR Y10 |
| 240 | AND NOT CR 292 |
| 241 | OR NOT X 32 |
| 242 | AND NOT CR 302 |
| 243 | AND X 109 |
| 244 | OR STR |
| 245 | OUT Y10 |
| 246 | STR Y10 |
| 247 | STR Y10 |
| 248 | TMR |
| 249 | 150 |
| 250 | + |
| 251 | OUT CR 292 |
| 252 | CTR Y8 |
| 253 | OUT Y9 |
| 258 | STR X 6 |
| 259 | MCR 6 |
| 260 | STR X 44 |
| 261 | AND X 23 |
| 262 | OUT Y11 |
| 263 | STR Y10 |
| 264 | AND CR 261 |
| 265 | OR Y15 |
| 266 | AND NOT CR 278 |
| 267 | AND NOT CR 323 |
| 268 | AND CR 289 |
| 269 | OUT Y12 |
| 270 | STR CR 258 |
| 271 | AND NOT X 23 |
| 272 | STR NOT Y 10 |
| 273 | AND NOT X 110 |
| 274 | CTR |
| 275 | 3 |
| 276 | + |
| 277 | OUT CR 278 |
| 278 | STR CR 322 |
| 279 | AND NOT CR 323 |
| 280 | OUT Y 13 |
| 281 | STR CR 258 |
| 282 | AND CR 316 |
| 283 | STR NOT CR 322 |
| 284 | AND NOT X 110 |
| 285 | CTR |
| 286 | 4 |
| 287 | + |
| 289 | STR Y 15 |
| 290 | AND NOT CR 273 |
| 291 | OR NOT X 24 |
| 292 | AND NOT CR 302 |
| 293 | AND X 109 |
| 294 | OR STR |
| 295 | OUT Y 15 |
| 296 | STR Y 15 |
| 297 | STR Y 15 |
| 298 | TMR |
| 299 | 150 |
| 300 | + |
| 301 | OUT CR 293 |
| 302 | STR Y 13 |
| 303 | OUT Y 14 |
| 308 | STR X 7 |
| 309 | MCR 6 |
| 310 | STR X 45 |
| 311 | AND X 25 |
| 312 | OUT Y 16 |
| 313 | STR Y 15 |
| 314 | AND CR 261 |
| 315 | OR Y 20 |
| 316 | AND NOT CR 279 |
| 317 | AND NOT 318 |
| 318 | AND CR 289 |
| 319 | OUT Y 17 |
| 320 | STR CR 258 |
| 321 | AND NOT X 25 |
| 322 | STR NOT Y 15 |
| 323 | AND NOT X 110 |
| 324 | CTR |
| 325 | 3 |
| 326 | + |
| 327 | OUT CR 279 |
| 328 | STR CR 317 |
| 329 | AND NOT CR 318 |
| 330 | OUT Y 18 |
| 331 | STR CR 258 |
| 332 | AND CR 311 |
| 333 | STR NOT CR 317 |
| 334 | AND NOT X 110 |
| 335 | CTR |
| 336 | 4 |
| 337 | + |
| 339 | STR Y 20 |
| 340 | AND NOT CR 294 |
| 341 | OR NOT X 26 |
| 342 | AND NOT CR 302 |
| 343 | AND X 109 |
| 344 | OR STR |
| 345 | OUT Y 20 |
| 346 | STR Y 20 |
| 347 | STR Y 20 |
| 348 | TMR |
| 349 | 150 |
| 350 | + |
| 351 | OUT CR 294 |
| 352 | STR Y 18 |
| 353 | OUT Y 19 |
| 358 | STR x 8 |
| 359 | MCR 6 |
| 360 | STR X 46 |
| 361 | AND X 27 |
| 362 | OUT Y 21 |
| 363 | STR Y 20 |
| 364 | AND CR 261 |
| 365 | OR Y 25 |
| 366 | AND NOT CR 313 |
| 368 | AND CR 289 |
| 369 | OUT Y 22 |
| 370 | STR CR 258 |
| 371 | AND NOT X 27 |
| 372 | STR NOT Y 20 |
| 373 | AND NOT X 110 |
| 374 | CTR |
| 375 | 3 |
| 376 | + |
| 377 | OUT CR 280 |
| 378 | STR CR 312 |
| 379 | AND NOT CR 313 |
| 380 | OUT Y 23 |
| 381 | STR CR 258 |
| 382 | AND CR 306 |
| 383 | STR NOT CR 312 |
| 384 | AND NOT X 110 |
| 385 | CTR |
| 386 | 4 |
| 387 | + |
| 389 | STR Y 25 |
| 390 | AND NOT CR 295 |
| 391 | OR NOT X 28 |
| 392 | AND NOT CR 302 |
| 393 | AND X 109 |

TABLE 3-continued

| NO. | COMMANDS |
|---|---|
| 394 | OR STR |
| 395 | OUT Y 25 |
| 396 | STR Y 25 |
| 397 | STR Y 25 |
| 398 | TMR |
| 399 | 150 |
| 400 | + |
| 401 | OUT CR 295 |
| 402 | STR Y 23 |
| 403 | OUT Y 24 |
| 410 | STR x 9 |
| 411 | MCR 6 |
| 412 | STR X 47 |
| 413 | AND X 29 |
| 414 | OUT Y 26 |
| 415 | STR Y 25 |
| 416 | AND CR 261 |
| 417 | OR CR 302 |
| 418 | AND NOT CR 281 |
| 419 | AND NOT CR 308 |
| 420 | AND CR 289 |
| 422 | OUT Y 27 |
| 423 | STR CR 258 |
| 424 | AND NOT X 29 |
| 425 | STR NOT Y 25 |
| 426 | AND NOT X 110 |
| 427 | CTR |
| 428 | 3 |
| 429 | + |
| 430 | OUT CR 281 |
| 431 | STR CR 307 |
| 432 | AND NOT CR 308 |
| 433 | OUT Y 28 |
| 435 | STR Y 3 |
| 436 | OR Y0 |
| 437 | OUT Y 30 |
| 440 | STR Y 28 |
| 441 | OUT Y 29 |
| 475 | STR X 13 |
| 476 | MCR 5 |
| 477 | STR X 21 |
| 478 | OUT Y 48 |
| 481 | STR X 23 |
| 482 | OUT Y 49 |
| 485 | STR X 25 |
| 486 | OUT Y 50 |
| 489 | STR X 27 |
| 490 | OUT Y 51 |
| 493 | STR X 29 |
| 494 | OUT Y 52 |
| 496 | STR CR 273 |
| 497 | STR NOT CR 260 |
| 498 | CTR |
| 499 | 50 |
| 500 | + |
| 501 | OUT Y 95 |
| 510 | STR x 21 |
| 511 | AND Y 30 |
| 512 | AND NOT CR 327 |
| 513 | STR X 23 |
| 514 | AND Y 10 |
| 515 | AND NOT CR 322 |
| 516 | OR STR |
| 517 | STR X 25 |
| 518 | AND Y 15 |
| 519 | AND NOT CR 317 |
| 520 | OR STR |
| 521 | STR X 27 |
| 522 | AND Y 20 |
| 523 | AND NOT CR 312 |
| 524 | OR STR |
| 525 | STR X 29 |
| 526 | AND Y 25 |
| 527 | AND NOT CR 307 |
| 528 | OR STR |
| 529 | OR Y 72 |
| 530 | AND X 78 |
| 531 | AND CR 302 |
| 532 | OUT Y 72 |
| 550 | STR X 5 |
| 551 | AND X 6 |

TABLE 3-continued

| NO. | COMMANDS |
|---|---|
| 552 | AND X 7 |
| 553 | AND X 8 |
| 554 | AND X 9 |
| 557 | AND X 12 |
| 558 | AND X 13 |
| 559 | AND X 78 |
| 564 | AND NOT Y 72 |
| 565 | AND NOT X 0 |
| 566 | AND NOT Y 76 |
| 567 | OUT CR 289 |
| 568 | STR NOT CR 289 |
| 569 | OUT Y 71 |
| 570 | STR NOT CR 289 |
| 571 | AND NOT X 39 |
| 572 | OR Y 72 |
| 574 | AND X 78 |
| 575 | OUT Y 69 |
| 578 | STR Y 69 |
| 579 | AND Y 79 |
| 580 | OUT Y 75 |
| 582 | STR X 14 |
| 583 | OR Y 76 |
| 584 | AND X 78 |
| 585 | OUT Y 76 |
| 1000 | STR X 111 |
| 1001 | STR NOT CR 256 |
| 1002 | TMR |
| 1003 | 10 |
| 1004 | + |
| 1005 | OUT Y 79 |
| 1006 | STR Y 79 |
| 1007 | STR Y 79 |
| 1008 | TMR |
| 1009 | 10 |
| 1010 | + |
| 1011 | OUT CR 256 |

TABLE 4

| NO. | COMMANDS |
|---|---|
| 12 | STR X 5 |
| 15 | STR NOT CR 258 |
| 16 | TMR |
| 17 | 599 |
| 18 | + |
| 19 | OUT CR 258 |
| 23 | STR NOT CR 260 |
| 24 | MCR 46 |
| 25 | STR CR 258 |
| 26 | AND CR 261 |
| 27 | AND NOT CR 257 |
| 28 | JUMP 45 |
| 29 | STR CR 344 |
| 30 | OUT CR 345 |
| 31 | STR CR 343 |
| 32 | OUT CR 344 |
| 33 | STR CR 342 |
| 34 | OUT CR 343 |
| 35 | STR CR 341 |
| 36 | OUT CR 342 |
| 37 | STR CR 340 |
| 38 | OUT CR 341 |
| 39 | STR CR 339 |
| 40 | OUT CR 340 |
| 41 | STR CR 338 |
| 42 | OUT CR 339 |
| 43 | STR CR 337 |
| 44 | OUT CR 338 |
| 45 | STR CR 336 |
| 46 | OUT CR 337 |
| 47 | STR CR 335 |
| 48 | OUT CR 336 |
| 49 | STR CR 334 |
| 50 | OUT CR 335 |
| 51 | STR CR 333 |
| 52 | OUT CR 334 |
| 53 | STR CR 332 |
| 54 | OUT CR 333 |
| 55 | STR CR 331 |

TABLE 4-continued

| NO. | COMMANDS |
|---|---|
| 56 | OUT CR 332 |
| 57 | STR CR 330 |
| 58 | OUT CR 331 |
| 59 | STR CR 329 |
| 60 | OUT CR 330 |
| 61 | STR CR 328 |
| 62 | OUT CR 329 |
| 63 | STR CR 327 |
| 64 | OUT CR 328 |
| 65 | STR CR 326 |
| 66 | OUT CR 327 |
| 67 | STR CR 325 |
| 68 | OUT CR 326 |
| 69 | STR CR 324 |
| 70 | OUT CR 325 |
| 71 | STR CR 323 |
| 72 | OUT CR 324 |
| 73 | STR CR 322 |
| 74 | OUT CR 323 |
| 75 | STR CR 321 |
| 76 | OUT CR 322 |
| 77 | STR CR 320 |
| 78 | OUT CR 321 |
| 79 | STR CR 319 |
| 80 | OUT CR 320 |
| 81 | STR CR 318 |
| 82 | OUT CR 319 |
| 83 | STR CR 317 |
| 84 | OUT CR 318 |
| 85 | STR CR 316 |
| 86 | OUT CR 317 |
| 87 | STR CR 315 |
| 88 | OUT CR 316 |
| 89 | STR CR 314 |
| 90 | OUT CR 315 |
| 91 | STR CR 313 |
| 92 | OUT CR 314 |
| 93 | STR CR 312 |
| 94 | OUT CR 313 |
| 95 | STR CR 311 |
| 96 | OUT CR 312 |
| 97 | STR CR 310 |
| 98 | OUT CR 311 |
| 99 | STR CR 309 |
| 100 | OUT CR 310 |
| 101 | STR CR 308 |
| 102 | OUT CR 309 |
| 103 | STR CR 307 |
| 104 | OUT CR 308 |
| 105 | STR CR 306 |
| 106 | OUT CR 307 |
| 107 | STR CR 305 |
| 108 | OUT CR 306 |
| 109 | STR CR 304 |
| 110 | OUT CR 305 |
| 111 | STR CR 303 |
| 112 | OUT CR 304 |
| 113 | STR CR 302 |
| 114 | OUT CR 303 |
| 115 | STR CR 301 |
| 116 | OUT CR 302 |
| 117 | STR CR 258 |
| 118 | OUT CR 301 |
| 119 | STR CR 258 |
| 120 | OUT CR 257 |
| 122 | STR CR 333 |
| 123 | AND X 42 |
| 124 | OR NOT X 5 |
| 125 | OUT CR 260 |
| 126 | STR CR 258 |
| 127 | OUT Y 5 |
| 128 | STR CR 258 |
| 129 | AND CR 261 |
| 130 | STR NOT CR 260 |
| 131 | CTR |
| 132 | 50 |
| 133 | + |
| 134 | OUT Y 15 |
| 135 | STR X 40 |
| 136 | AND Y 41 |
| 137 | OR CR 261 |
| 138 | OR CR 303 |
| 139 | AND NOT CR 333 |
| 140 | AND X 5 |
| 141 | AND NOT CR 287 |
| 142 | AND NOT X 6 |
| 143 | OUT CR 261 |
| 401 | STR CR 305 |
| 402 | AND NOT CR 306 |
| 403 | STR CR 311 |
| 404 | AND NOT CR 312 |
| 405 | OR STR |
| 406 | STR CR 317 |
| 407 | AND NOT CR 318 |
| 408 | CR STR |
| 409 | STR CR 323 |
| 410 | AND NOT CR 324 |
| 411 | OR STR |
| 412 | STR CR 329 |
| 413 | AND NOT CR 330 |
| 414 | OR STR |
| 415 | OR CR 287 |
| 416 | AND NOT X43 |
| 417 | AND X 5 |
| 418 | OR NOT X 3 |
| 419 | OUT CR 287 |
| 422 | STR CR 287 |
| 423 | OUT Y 2 |
| 430 | STR CR 303 |
| 431 | AND NOT CR 309 |
| 433 | AND NOT CR 310 |
| 434 | OR STR |
| 435 | STR CR 315 |
| 436 | AND NOT CR 316 |
| 437 | OR STR |
| 438 | STR CR 321 |
| 439 | AND NOT CR 322 |
| 440 | OR STR |
| 441 | STR CR 327 |
| 442 | AND NOT CR 328 |
| 443 | OR STR |
| 444 | AND X 43 |
| 445 | STR X 43 |
| 446 | TMR |
| 447 | 20 |
| 448 | + |
| 449 | OR CR 290 |
| 450 | AND X 5 |
| 451 | OUT CR 290 |
| 452 | |
| 454 | STR CR 290 |
| 455 | OUT Y 1 |
| 460 | STR X 11 |
| 461 | AND X 12 |
| 462 | STR X 11 |
| 463 | AND X 13 |
| 464 | OR STR |
| 465 | STR X 11 |
| 466 | AND X 14 |
| 467 | OR STR |
| 468 | STR X 11 |
| 469 | AND X 15 |
| 470 | OR STR |
| 471 | STR X 12 |
| 472 | AND X 13 |
| 473 | OR STR |
| 474 | STR X 12 |
| 475 | AND X 14 |
| 476 | OR STR |
| 480 | STR X 13 |
| 481 | AND X 14 |
| 482 | OR STR |
| 483 | STR X 13 |
| 484 | AND X 15 |
| 485 | OR STR |
| 486 | STR X 14 |
| 487 | AND X 15 |
| 488 | OR STR |
| 489 | STR X 5 |
| 490 | AND NOT X 43 |
| 491 | TMR |
| 492 | 20 |

TABLE 4-continued

| NO. | COMMANDS |
|---|---|
| 493 | + |
| 494 | OR CR 291 |
| 495 | OR Y1 |
| 496 | AND X 5 |
| 497 | OUT CR 291 |
| 498 | STR CR 291 |
| 499 | OUT Y0 |
| 512 | STR X 3 |
| 513 | MCR 15 |
| 514 | STR NOT CR 261 |
| 515 | AND X 44 |
| 516 | OUT Y 55 |
| 518 | STR NOT CR 261 |
| 520 | OR NOT CR 302 |
| 521 | AND X 41 |
| 522 | STR X 41 |
| 523 | AND NOT Y 40 |
| 524 | OR STR |
| 525 | AND NOT CR 291 |
| 527 | OUT Y 41 |
| 528 | STR X 40 |
| 529 | AND X 42 |
| 530 | STR Y 40 |
| 531 | AND NOT Y 41 |
| 532 | OR STR |
| 533 | OUT Y 40 |
| 557 | STR Y 63 |
| 558 | AND X 43 |
| 559 | STR CR 302 |
| 560 | AND NOT CR 333 |
| 561 | AND NOT X 43 |
| 562 | OR STR |
| 563 | OUT Y 42 |
| 600 | STR Y 50 |
| 601 | OUT Y 51 |
| 605 | STR Y 49 |
| 606 | OUT Y 52 |
| 634 | STR CR 303 |
| 635 | AND NOT CR 333 |
| 636 | OUT Y 43 |
| 660 | STR CR 303 |
| 661 | AND NOT CR 306 |
| 662 | OR CR 309 |
| 663 | AND NOT CR 312 |
| 664 | OR CR 315 |
| 665 | AND NOT CR 318 |
| 666 | OR CR 321 |
| 667 | AND NOT CR 324 |
| 668 | OR CR 327 |
| 669 | AND NOT CR 330 |
| 670 | AND CR 274 |
| 671 | OUT Y 49 |
| 673 | STR NOT X 43 |
| 674 | STR NOT X 43 |
| 675 | TMR |
| 676 | 100 |
| 677 | + |
| 678 | OUT CR 274 |
| 680 | STR CR 306 |
| 681 | AND NOT CR 309 |
| 682 | OR CR 312 |
| 683 | AND NOT CR 315 |
| 684 | OR CR 318 |
| 685 | AND NOT CR 321 |
| 686 | OR CR 324 |
| 687 | AND NOT CR 327 |
| 688 | OR CR 330 |
| 689 | AND NOT CR 333 |
| 690 | OUT Y 50 |
| 720 | STR CR 303 |
| 721 | AND NOT CR 309 |
| 722 | OUT Y 44 |
| 750 | STR CR 309 |
| 751 | AND NOT CR 315 |
| 752 | OUT Y 45 |
| 770 | STR CR 315 |
| 771 | AND NOT CR 321 |
| 772 | OUT Y 46 |
| 790 | STR CR 321 |
| 791 | AND NOT CR 327 |
| 792 | OUT Y 47 |
| 810 | STR CR 327 |
| 811 | AND NOT CR 333 |
| 812 | OUT Y 48 |
| 910 | STR CR 303 |
| 911 | AND NOT CR 304 |
| 912 | AND X 43 |
| 913 | OR Y 79 |
| 914 | OUT Y 79 |
| 915 | STR CR 309 |
| 916 | AND NOT CR 310 |
| 917 | AND X 43 |
| 918 | OR Y 80 |
| 919 | OUT Y 80 |
| 920 | STR CR 315 |
| 921 | AND NOT CR 316 |
| 922 | AND X 43 |
| 923 | OR Y 82 |
| 924 | OUT Y 82 |
| 925 | STR CR 321 |
| 926 | AND NOT CR 322 |
| 927 | AND X 43 |
| 928 | OR Y 83 |
| 929 | OUT Y 83 |
| 930 | STR CR 327 |
| 931 | AND NOT CR 328 |
| 932 | AND X 43 |
| 933 | OR Y 84 |
| 934 | OUT Y 84 |
| 1000 | STR NOT X 63 |
| 1001 | STR NOT CR 256 |
| 1002 | TMR |
| 1003 | 10 |
| 1004 | + |
| 1005 | OUT Y 63 |
| 1006 | STR Y 63 |
| 1007 | STR Y 63 |
| 1008 | TMR |
| 1009 | 10 |
| 1010 | + |
| 1011 | OUT CR 256 |

What is claimed is:

1. A method of washing an object in a wash tank with a sequence of washes with media of progressively decreasing impurity concentration, which minimizes unnecessary mixing of wash media without measuring degree of draining of the wash tank, comprising the steps of:

(a) providing plural valved sources of wash media of progressively decreasing impurity concentration, (b) filling a wash tank with a first wash medium at a relatively constant rate by opening at least a first valve associated with a source of said first wash medium, (c) terminating said filling steps on detection of a predetermined level of wash medium in said wash tank, and closing at least one valve, (d) providing relative motion between said wash medium in said tank and said object, (e) draining said wash tank after a fixed period of said step (d), said draining step terminating a predetermined time after initiation and including the step of closing said at least a first valve, (f) repeating in sequence steps (b) through (e) with further wash media of progressively decreasing impurity concentration, (g) timing a period between initiation of step (b) and step (c), and (h) effecting an alarm function if said period is less than a predetermined period.

2. A method of effecting a washing operation on each of a plurality of production lines operating independently of each other which method comprises, in any of said production lines, the steps recited in claim 1, and which further includes:

i. providing a said wash tank for each of said production lines.

3. The method of claim 1 in which said alarm function includes inhibiting said step (e).

4. The method of claim 1 in which said alarm function includes inhibiting said step (f).

5. The method of claim 1 in which said step (b) includes energizing a pump associated with said wash tank, and in which said steps (c) and (d) are effected by opening and closing valves and maintaining said pump energized.

6. The method of claim 1 in which said step (a) includes providing supply tanks for each of said sources of piping between said supply tank and said wash tank and wherein each of said supply tanks is located relative to said wash tank to provide a substantial gravity head to assist in filling said wash tank.

7. The method of claim 1 which includes the step of:

(i) monitoring impurity concentration of at least one of said sources, and (j) at times cascading said sources by draining a source of highest impurity concentration and transferring, to said source, wash media of a source of next lower impurity concentration, sequentially transferring wash medium of further sources to an adjacent empty source and filling the last source with a fresh wash medium, wherein said step (j) is begun when said monitored impurity concentration reaches a predetermined thereshold.

8. The method of claim 7 wherein said step (i) comprises measuring impurity concentration of only a source of lowest impurity concentration.

9. The method of claim 8 in which said wash medium is deionized water and said impurity comprises sodium nitrate and sodium hydroxide.

10. The method of claim 8 in which said measurement comprises a conductivity measurement of said source of said lowest impurity concentration.

11. The method of claim 1 in which said step (a) comprises providing five sources of wash media.

* * * * *